US010312823B1

(12) United States Patent
Montgomery et al.

(10) Patent No.: US 10,312,823 B1
(45) Date of Patent: Jun. 4, 2019

(54) POWER INVERTER

(71) Applicants: Nicholas Montgomery, The Villages, FL (US); Jose Illidge, Hollywood, FL (US)

(72) Inventors: Nicholas Montgomery, The Villages, FL (US); Jose Illidge, Hollywood, FL (US)

(*) Notice: Subject to any disclaimer, the term of this patent is extended or adjusted under 35 U.S.C. 154(b) by 0 days.

(21) Appl. No.: 15/805,970

(22) Filed: Nov. 7, 2017

Related U.S. Application Data

(63) Continuation-in-part of application No. 29/563,597, filed on May 5, 2016, now Pat. No. Des. 805,473.

(60) Provisional application No. 62/418,752, filed on Nov. 7, 2016.

(51) Int. Cl.
*H02M 7/44* (2006.01)
*H02J 7/02* (2016.01)
*H04W 4/60* (2018.01)

(52) U.S. Cl.
CPC ............ *H02M 7/44* (2013.01); *H02J 7/02* (2013.01); *H04W 4/60* (2018.02)

(58) Field of Classification Search
CPC ........... H02M 7/44; H02M 2001/0067; H02M 2001/007; H02M 2001/0045; H02M 2001/0083; H02M 2001/009; H02J 7/02; H02P 27/04; H02P 27/06; H02P 27/047; H02P 2201/09; H02P 2201/11; G06F 1/00; G06F 1/188; G06F 1/189; G06F 1/26; G06F 11/2015; H01R 13/66; H01R 13/60; H01R 13/72; H01R 13/6675; H01R 31/065; H05K 5/0021; H05K 5/0208; H05K 5/0247; H05K 5/00
USPC ............................. 363/95–97, 100, 109, 120
See application file for complete search history.

(56) References Cited

U.S. PATENT DOCUMENTS

| | | | | |
|---|---|---|---|---|
| 4,194,182 A * | 3/1980 | Martin | ................ | H02J 13/0024 307/125 |
| 7,660,345 B2 * | 2/2010 | Yu | ............................ | H04B 3/44 375/219 |
| 8,400,014 B2 * | 3/2013 | Li | ......................... | H02J 7/0068 307/48 |
| 8,768,565 B2 * | 7/2014 | Jefferies | ................. | G07B 15/00 701/29.6 |

(Continued)

*Primary Examiner* — Yemane Mehari
(74) *Attorney, Agent, or Firm* — Allen D. Hertz, P.A.; Allen D. Hertz

(57) ABSTRACT

A power inverter comprising a power inverter circuit to convert alternating current (AC) power to direct current (DC) power, a condition monitoring system, a wired and/or wireless communication circuit, and a manual/automatic power selection capability. The power inverter can additionally include a remote controller and power inverter remote unit, a vehicle monitoring system, and an association with a portable computing device application. The power inverter remote unit replicates a power inverter controller circuit of the power inverter and provides additional alternating current (AC) output socket(s). The application is adapted to be run on a portable computing device and could include features to remotely activate and/or configure the inverter, obtain inverter operating characteristics, obtain error notifications, and monitor a vehicle status and/or operating history. The power inverter can additionally include a DC charging circuit, converting DC power to AC power.

20 Claims, 16 Drawing Sheets

(56) References Cited

U.S. PATENT DOCUMENTS

2002/0158591 A1* 10/2002 Ribarich ............ H05B 37/0254
315/291
2017/0324195 A1* 11/2017 Eriksen .............. H01R 13/6666

* cited by examiner

POWER INVERTER

CROSS REFERENCE TO RELATED APPLICATION

This Non-Provisional Patent Application is:
a Continuation-In-Part Patent claiming the benefit of United States Design patent application Ser. No. 29/563,597, filed on May 5, 2016;
this Application is also a Non-Provisional Patent Application claiming the benefit of U.S. Provisional Patent Application Ser. No. 62/418,752, filed on Nov. 7, 2016,
each of which are incorporated herein by reference in their entireties.

FIELD OF THE INVENTION

The present invention relates to a power inverter, and more particularly, a power inverter comprising a power inverter circuit, a condition monitoring system, a wired and/or wireless communication circuit, and a manual/automatic power selection capability. The power inverter can additionally include a remote controller and power distribution unit, a vehicle monitoring system, and an association with a portable computing device application.

BACKGROUND OF THE INVENTION

Power inverters convert power from a direct current (DC) power source to an alternating power (AC) output.

The input voltage, output voltage and frequency, and overall power handling depend on the design of the specific device or circuitry. The inverter does not produce any power; the power is provided by the DC source.

A power inverter can be entirely electronic or may be a combination of mechanical effects (such as a rotary apparatus) and electronic circuitry. Static inverters do not use moving parts in the conversion process.

An inverter can produce a square wave, modified sine wave, pulsed sine wave, pulse width modulated wave (PWM) or sine wave depending on circuit design. The two dominant commercialized waveform types of inverters are modified sine wave and sine wave.

There are two basic designs for producing household plug-in voltage from a lower-voltage DC source, the first of which uses a switching boost converter to produce a higher-voltage DC and then converts to AC. The second method converts DC to AC at battery level and uses a line-frequency transformer to create the output voltage.

An inverter converts the DC electricity from sources such as batteries or fuel cells to AC electricity. The electricity can be at any required voltage; in particular it can operate AC equipment designed for mains operation, or rectified to produce DC at any desired voltage.

The power inverter can be used as an uninterruptible power supply (UPS). The uninterruptible power supply (UPS) uses batteries and an inverter to supply AC power when mains power is not available.

The power inverter can be used as an electric motor speed control. Inverter circuits designed to produce a variable output voltage range are often used within motor speed controllers. The DC power for the inverter section can be derived from a normal AC wall outlet or some other source. Control and feedback circuitry is used to adjust the final output of the inverter section which will ultimately determine the speed of the motor operating under its mechanical load.

Power inverters are subject to faults. These faults can cause damage to the equipment powered by the power inverter, damage to the power source (battery, etc.), and damage to the power inverter itself. Examples include incorrect input voltage, overload in the power consumption, over temperature, a short circuit, and the like. Additionally, the operator is commonly locating in a position to view the power inverter. Accordingly, there remains a need in the art for a device that enables an operator to be aware of operating parameters of the inverter and/or to be alerted when the inverter is subject to an adverse operating condition. This could include a capability for remote notification to the operator or another monitoring party.

Power inverters commonly include a power switch. Power inverters can be installed within a circuit comprising a system power switch, such as a vehicle, which governs the supply of DC power to the power inverter. The system power switch can control operation to the power inverter. This configuration would require the user to actuate two switches to obtain a power output from the power inverter, more specifically, the system power switch and then the power inverter switch. Accordingly, there remains a need in the art for a device that can enable the user to reduce the number of switches that need to be actuated by the user to obtain power from the power inverter.

When installed in a mobile application, such as a vehicle, or more specifically, a commercial vehicle, it may be desirable to track the use of the vehicle.

BRIEF SUMMARY OF THE INVENTION

The present invention overcomes the deficiencies of the known art and the problems that remain unsolved by providing a power inverter and a respective method of use comprising any of a number of enhanced features, including a power switch bypass capability, remote operation, remote status notification, location tracking, inclusion or integration with a remote unit providing operation control and power output, and the like.

In accordance with one embodiment of the present invention, the invention includes a power inverter, the power inverter comprising:
   a power inverter circuit adapted to convert a direct current (DC) input to an alternating current (AC) output;
   a microprocessor; and
   a communication circuit in signal communication with the microprocessor,
   wherein the microprocessor operates in accordance with an instruction set to monitor operating conditions of the power inverter and forward error codes to an operator through the communication circuit.

In a second aspect, the inverter further comprises a housing.

In another aspect, the power inverter housing includes an extruded housing section, a power inverter operating panel and a power inverter input panel. The power inverter operating panel and the power inverter input panel can be assembled to the extruded housing section using mechanical fasteners, such as screws.

In yet another aspect, the power inverter housing further includes a bottom panel. The bottom panel is slideably assembled to a bottom panel receiving track formed within the extruded housing section, wherein the bottom panel receiving track extends along an extruded direction.

In another aspect, at least one of the power inverter operating panel and the power inverter input panel includes a power inverter end panel mounting flange. The power inverter end panel mounting flange preferably extends outward from the respective power inverter end panel at a right (90°) angle.

In another aspect, the power inverter end panel mounting flange includes a mounting feature.

In another aspect, the power inverter end panel mounting flange mounting feature is formed as an aperture.

In another aspect, the power inverter end panel mounting flange mounting feature is formed as a slot.

In yet another aspect, the power inverter housing further includes a plurality of mounting feet. Each mounting foot is preferably located proximate or in registration with the respective power inverter end panel mounting flange mounting feature.

In yet another aspect, the power inverter housing mounting feet are fabricated of a pliant material.

In yet another aspect, the alternating current (AC) output is provided to an alternating current (AC) socket.

In yet another aspect, the alternating current (AC) output is provided to Universal Serial Bus (USB) connector.

In another aspect, the alternating current (AC) output is provided to series of connectors adapted to establish a hardwire configuration.

In yet another aspect, the direct current (DC) input is provided from a 12 volt battery.

In yet another aspect, the direct current (DC) input is provided from at least one 12 volt battery located within a vehicle.

In yet another aspect, a battery isolator is integrated between the direct current (DC) source and power inverter input connectors.

In yet another aspect, an ignition switch is integrated between the direct current (DC) source and power inverter input connectors, wherein the ignition switch controls power from the direct current (DC) source to the power inverter input connectors.

In yet another aspect, the communication circuit includes at least one of: Ethernet, Wi-Fi, and Bluetooth communication protocol circuitry.

In yet another aspect, the error codes are provided in numeric format.

In yet another aspect, the error codes are provided in alphabetical format.

In yet another aspect, the error codes are provided in alpha-numeric format.

In yet another aspect, the power inverter further comprises an input voltage indicator, preferably provided in a format of an LED.

In yet another aspect, the power inverter further comprises an output wattage (KW) indicator, preferably provided in a format of an LED.

In yet another aspect, the power inverter further comprises an output wattage (W) indicator, preferably provided in a format of an LED.

In yet another aspect, the power inverter further comprises an error code display, preferably provided in a format of a liquid crystal display (LCD).

In yet another aspect, the power inverter further comprises a power switch.

In yet another aspect, the power inverter further comprises a bypass and/or remote control feature.

In yet another aspect, the bypass and/or remote control feature is provided in parallel with the power inverter power switch.

In yet another aspect, the bypass and/or remote control feature is operated by insertion of a bypass controller plug into a bypass controller socket.

In yet another aspect, the bypass and/or remote control feature is operated by a switch.

In yet another aspect, the bypass controller plug is provided in a form of an RJ series plug.

In yet another aspect, the bypass controller plug is provided in a form of an RJ45 plug.

In yet another aspect, the bypass controller plug is provided in a form of an RJ11 plug.

In yet another aspect, the bypass controller plug further comprises a light emitting indicator, wherein the preferred embodiment employs a Light Emitting Diode (LED).

In yet another aspect, the light emitting indicator of the bypass controller plug, employs a Light Emitting Diode (LED), wherein the LED can be a single color LED, a bi-color LED, or a multicolor LED.

In yet another aspect, the bypass controller plug further comprises a security device.

In yet another aspect, the power inverter further comprises an electromechanical power switch.

In yet another aspect, the electromechanical power switch is provided in parallel with the power inverter power switch.

In yet another aspect, the electromechanical power switch can be operated by a signal provide from a remote device to the communication circuit.

In yet another aspect, the electromechanical power switch can be operated by a signal provide from a remote device to the communication circuit, wherein the remote device is a portable computing device. Examples of portable computing devices include Smartphones, portable computing tablets, personal data assistants, and the like.

In yet another aspect, the power inverter interfaces with an inverter interface application installed on a portable computing device.

In yet another aspect, the inverter interface application can include a remote power controller function. The remote power controller function can be used to toggle the electromechanical power switch between an open and a closed configuration.

In yet another aspect, the remote controller function of the inverter interface application can be expanded to include a remote configuration function. The remote configuration function can be used to adjust any programmable configuration of the power inverter, including fault values, and the like.

In yet another aspect, the inverter interface application can include a power inverter operating characteristics function. The power inverter operating conditions function can provide status information of any of a variety of operating conditions of the power inverter.

In yet another aspect, examples of operating conditions of the power inverter that can be monitored using the power inverter operating characteristics function of the application can include:

Power status (on/off),
Manual or automatic power switching,
Remote unit installed or absent,
Input voltage,
Power inverter operating temperature,
Amperage (AMP) output,
Output voltage,
Ground Fault Circuit Interrupter (GFCI) status, and
the like.

In yet another aspect, the inverter interface application can include an inverter operational error notification function. The inverter operational error notification feature can notify the operator when an error or fault condition of any of a variety of operating conditions of the power inverter is predicted, approaching, or identified.

In yet another aspect, examples of error or fault conditions of the power inverter that can be monitored using the inverter operational error notification function of the application can include:
   A low input voltage condition,
   A high input voltage condition,
   An over temperature condition,
   A power overload condition,
   A Ground Fault Circuit Interrupter (GFCI) error, and
   the like.

In yet another aspect, the inverter interface application can include a vehicle information monitoring function. The vehicle information monitoring function can provide status information of any of a variety of operating conditions and/or tracking history of the vehicle.

In yet another aspect, examples of status information of any of a variety of operating conditions and/or tracking history of the inverter (reflective of the tracking history of the vehicle) that can be obtained through the inverter/vehicle information monitoring function of the application can include:
   Vehicle ignition status (on/off),
   Vehicle location,
   Vehicle speed,
   Vehicle tracking information, and
   the like.

In yet another aspect, the power inverter further comprises a Global Navigation Satellite System (GNSS) receiver. The Global Navigation Satellite System (GNSS) receiver is representative of any Global Positioning System (GPS) available regionally and/or globally.

In yet another aspect, the power inverter includes at least one feature for enhancing a cooling thereof.

In yet another aspect, the at least one cooling feature includes cooling fins integral with the extruded housing.

In yet another aspect, the at least one cooling feature includes cooling fins integral with the extruded housing, wherein the cooling fins include ridges running along a longitudinal axis thereof.

In yet another aspect, the at least one cooling feature includes cooling vents formed through at least one of the power inverter operating panel and the power inverter input panel.

In yet another aspect, the at least one cooling feature includes at least one cooling fan assembled proximate a cooling vent formed through at least one of the power inverter operating panel and the power inverter input panel.

In yet another aspect, the power inverter further comprises a charging circuit, wherein the charging circuit is adapted to convert an alternating current (AC) input to a direct current (DC) output. The charging circuit can include a power transformer.

In yet another aspect, the power inverter further comprises a power selector switch integrated between the power inverter circuit and the charging circuit. The power selector switch can automatically toggle based upon a change in condition of the input power source.

In accordance with a second embodiment of the present invention, the invention includes a power inverter, the power inverter comprising:
   a power inverter circuit adapted to convert a direct current (DC) input to an alternating current (AC) output;
   a power inverter power switch; and
   a bypass and/or remote control feature,
      wherein the bypass and/or remote control feature is provided in parallel with the power inverter power switch.

In another aspect, a power inverter remote unit can be connected to the power inverter.

In yet another aspect, the power inverter remote unit can include a remote operation circuit for remotely operating the power inverter. The remote operation circuit can replicate at least a portion of the operational controlling circuit of the power inverter.

In yet another aspect, the remote operation circuit can replicate at least a portion of the operational controlling circuit of the power inverter.

In yet another aspect, the remote operation circuit can provide operational controlling signals to the power inverter using a wired communication link.

In yet another aspect, the remote operation circuit can provide operational controlling signals to the power inverter using a wired communication link, wherein the wired communication link connects to the bypass and/or remote controller connector of the power inverter.

In yet another aspect, the remote operation circuit can provide operational controlling signals to the power inverter using a wireless communication link.

In yet another aspect, the power inverter remote unit can include at least one power outlet socket for distributing AC power from the power inverter.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
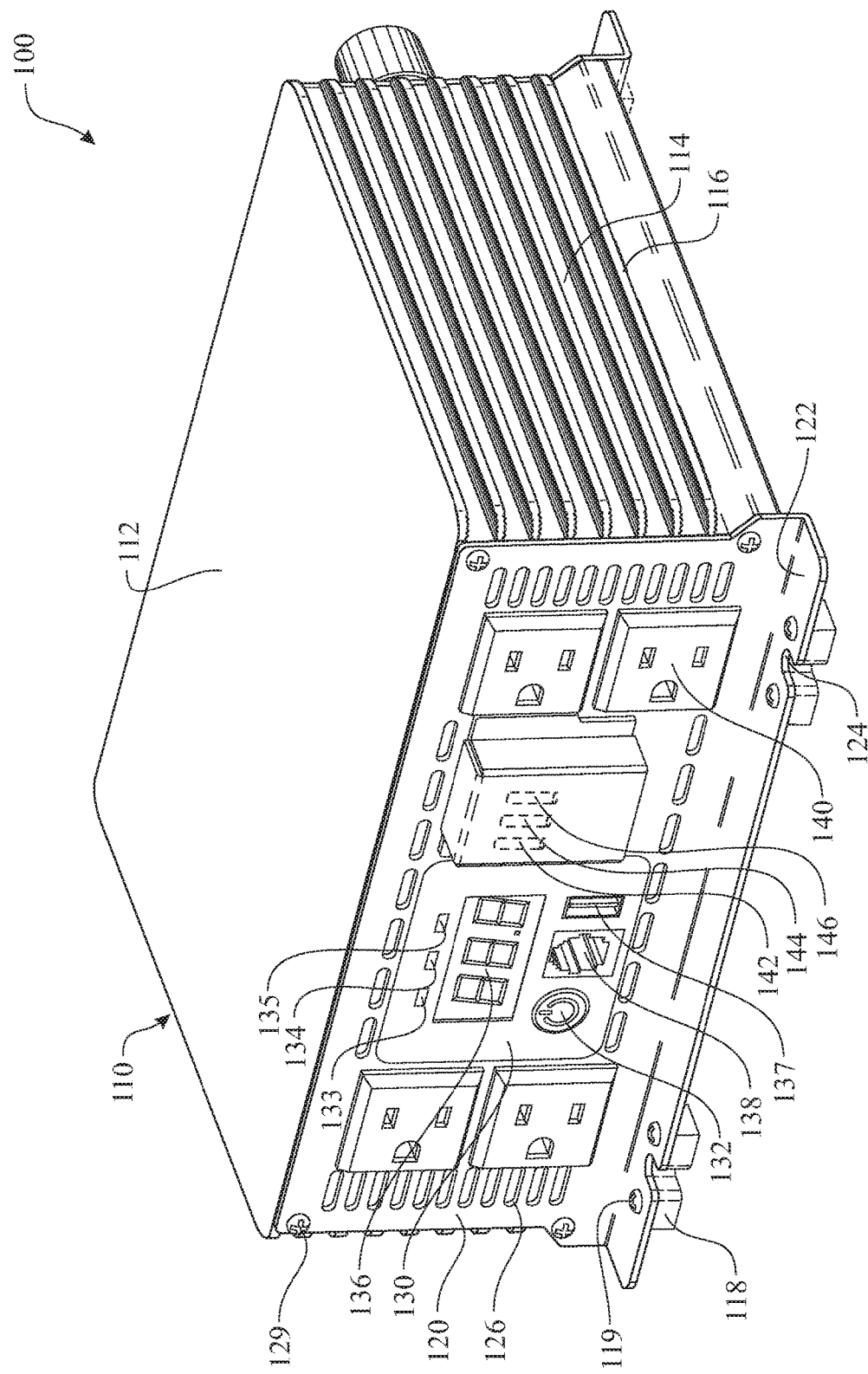
FIG. 1 presents an isometric view illustrating an operating side of a power inverter.
Figure 2:
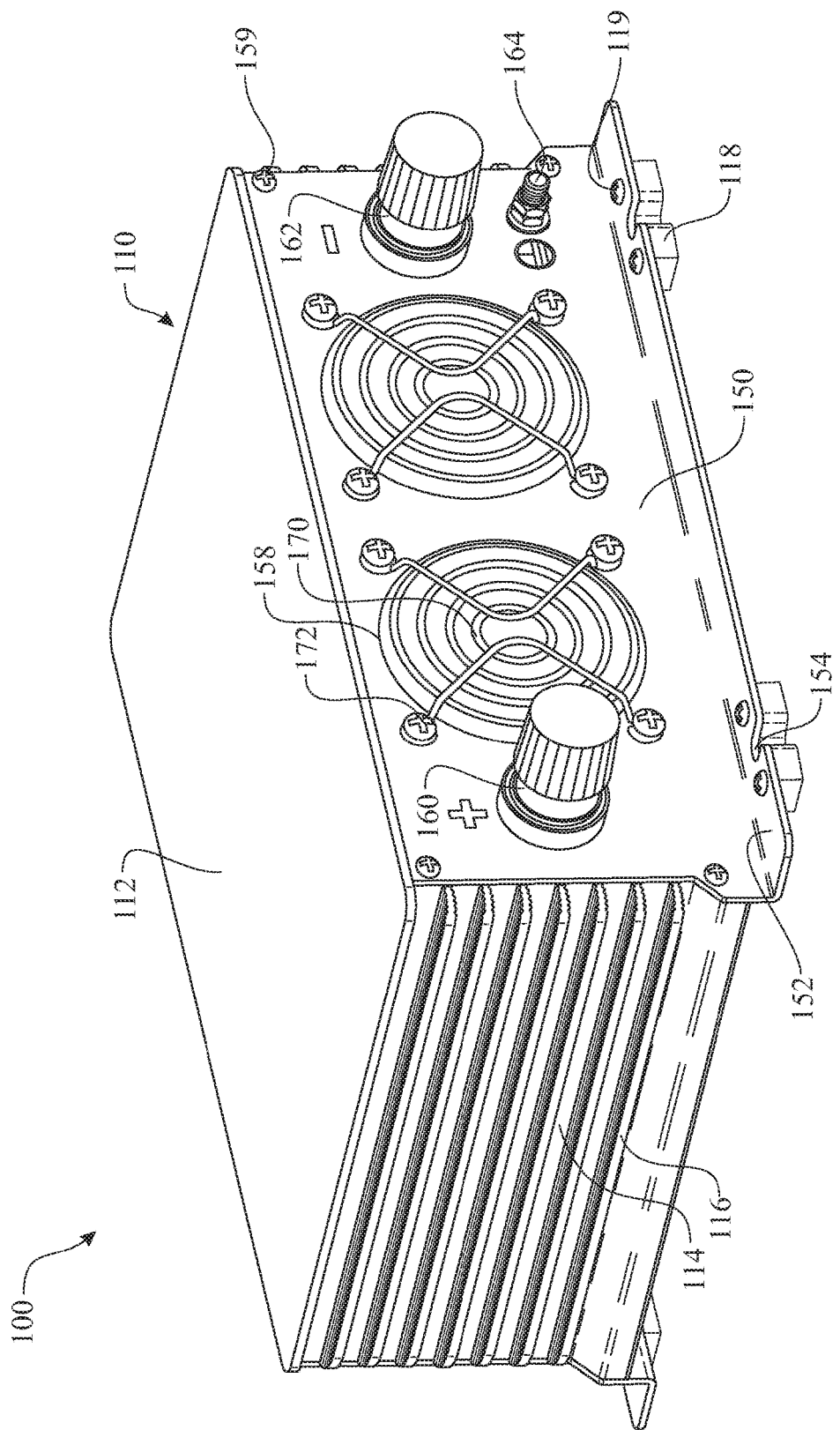
FIG. 2 presents an isometric view illustrating an input side of the power inverter originally introduced in FIG. 1.
Figure 3:
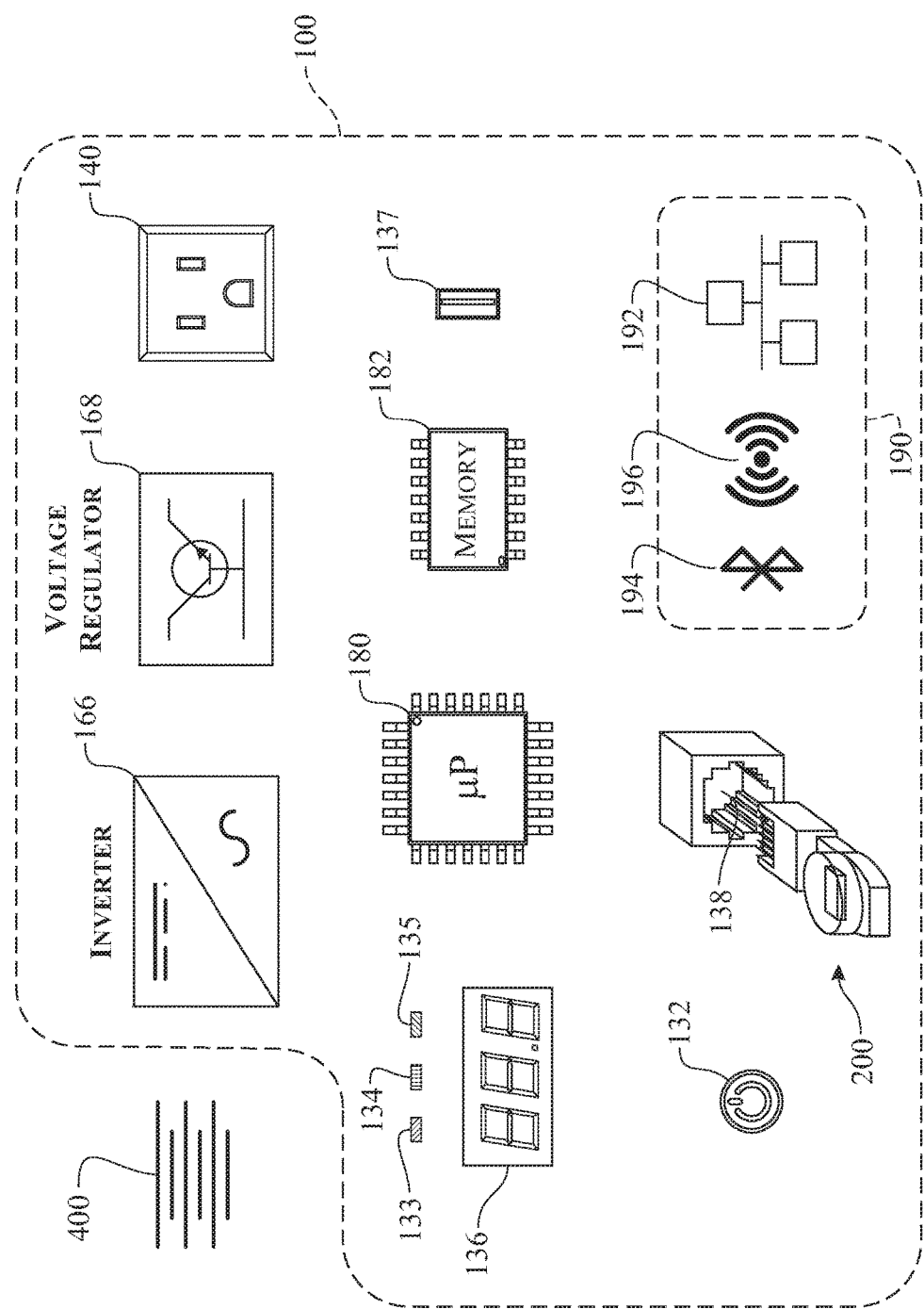
FIG. 3 presents a schematic diagram representative of a portion of the operating components of the power inverter originally introduced in FIG. 1.

A power inverter 100 is introduced in FIGS. 1 through 3, with additional features illustrated in FIGS. 8, 11, 12, 16, and 17. The power inverter 100 includes functional components integrated with a housing. The housing provides support and protection for the functional components. In the exemplary embodiment, the power inverter 100 includes a power inverter operating panel 120 assembled to a first end of a power inverter extruded housing 110 and a power inverter input panel 150 assembled to a second, opposite end of the power inverter extruded housing 110. The power inverter extruded housing 110 is preferably fabricated using an extruding process. The extruding process maintains a consistent cross sectional shape along an entire length of the power inverter extruded housing 110, excluding areas that are machined subsequent to the extruding process.

The power inverter extruded housing 110 can be formed having a power inverter extruded housing top panel 112 and a pair of power inverter extruded housing side panels 114. The power inverter extruded housing 110 can include an optional bottom panel (not shown) or a pair of slots for slidably receiving a separate bottom panel. In a configuration having a separate bottom panel, the bottom panel receiving slots would be formed proximate each distal, free end of the respective power inverter extruded housing side panel 114. The bottom panel receiving slots would run the length of the power inverter extruded housing 110 along an extruded direction and would be sized and shaped to receive mating edges of the bottom panel. At least a portion of the components can be assembled to the bottom panel prior to assembly of the bottom panel to the power inverter extruded housing 110.

In an alternative configuration, the power inverter extruded housing 110 can include a bottom panel (not shown) and a pair of assembly slots. The assembly slots would be adapted to receive edges of a printed circuit assembly or a printed circuit assembly carrier.

Mounting channels can be included in the cross sectional shape of the power inverter extruded housing 110. The mounting channels would be adapted to receive mechanical fasteners 129, 159 for assembly of the power inverter end panels 120, 150.

Each power inverter end panel 120, 150 can include a power inverter end panel mounting flange 122, 152. In the exemplary embodiment, the power inverter end panels 120, 150 are fabricated from a sheet of metal. During the fabrication process, each respective power inverter end panel mounting flange 122, 152 is formed by bending the predefined section of the respective power inverter end panel 120, 150. One or more power inverter end panel mounting flange fastener slots 124, 154 can be formed in the respective power inverter end panel mounting flange 122, 152.

At least one mounting foot 118 can be assembled to the power inverter 100. Each mounting foot 118 is preferably fabricated of a pliant material, such as a rubber to provide pliancy for seating, absorption of vibrations, and the like. In the exemplary embodiment, four mounting feet 118 are assembled to the power inverter 100, a pair of mounting feet 118 being assembled to each power inverter end panel 120, 150. Each mounting foot 118 can be assembled to the power inverter 100 using at least one mounting foot assembly fastener 119.

Cooling is a consideration when designing the power inverter 100. A series of power inverter extruded housing cooling fins 116 can be integrated into the cross sectional shape of the power inverter extruded housing 110. Cooling is a function of the exposed surface area of the power inverter extruded housing cooling fin 116. The power inverter extruded housing cooling fins 116 can include ridges across the broad cooling surface to increase the overall surface area thereof, thus increasing the cooling efficiency.

Power inverter end panel cooling ports 126 and/or power inverter input panel cooling ports 158 can be formed extending through the respective power inverter end panels 120, 150. In the exemplary embodiment, a plurality of power inverter operating panel cooling ports 126 are spatially arranged about the power inverter operating panel 120 and a pair of power inverter input panel cooling ports 158 are formed extending through the power inverter input panel 150. A cooling fan (not shown, but well understood) would be installed in registration with each respective power inverter input panel cooling port 158. A power inverter input panel cooling fan shroud 170 can be installed over the power inverter input panel cooling port 158 to protect the cooling fan, people, and other items from being damaged during operation of the cooling fans. The power inverter input panel cooling fan shroud 170 would be assembled to the power inverter input panel 150 using a predetermined quantity of power inverter input panel cooling fan shroud fasteners 172 as illustrated.

These are simply exemplary housing and assembly configurations, whereas it is understood that any suitable housing and assembly configuration can be used for assembling and protecting the functional components of the power inverter 100.

Figure 8:
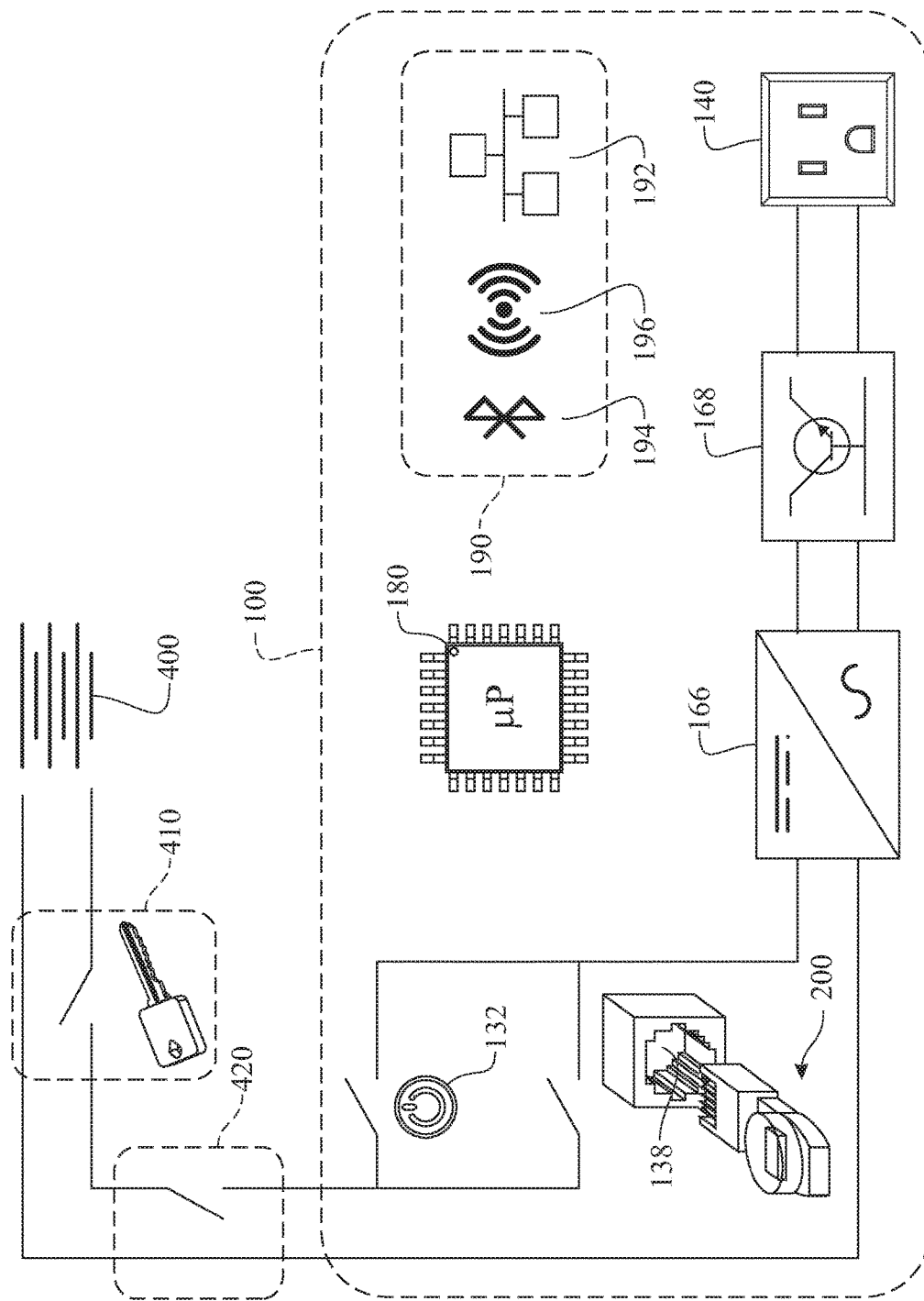
FIG. 8 presents a schematic diagram of an exemplary power circuit of the power inverter, the power circuit comprising a manual switch and a bypass configuration.

Electronic components are assembled to the power inverter 100 in accordance with the component and the assembly design. Direct current (DC) power is provided to the power inverter 100 by connectors assembled to the power inverter input panel 150. The DC power, such as a DC power supply 400 introduced in FIG. 3, is connected to power input terminals 160, 162. In certain installations, such as when the power inverter 100 is used in a vehicle, power from the DC power supply 400 can be controlled by a vehicle ignition switch 410, as illustrated in FIG. 8. A battery isolator 420 can be provided between the DC power supply 400 and the power inverter 100 for safety measures, as illustrated in FIG. 8. More specifically, the positive source from the DC power supply 400 is connected to the DC positive terminal 160 and a negative source from the DC power supply 400 is connected to the DC negative terminal 162. A ground cable can be connected to a DC ground terminal 164.

Operation of the power inverter 100 is controlled by a power inverter controller circuit assembly 130. The power inverter controller circuit assembly 130 includes a power inverter power switch 132, status indicators, including an input voltage indicator 133, an output wattage (KW) indicator 134, an output wattage (W) indicator 135, and an error code display 136, an various connectors, including a bypass and/or remote controller connector 138 and a Universal Serial Bus (USB) connector 137. The controller components can be provided as a subassembly to the power inverter extruded housing 110. The power inverter 100 is provided between the DC power supply 400 and an inverter 166, as shown in FIG. 8. The power inverter power switch 132 toggles between an open configuration and a closed configuration to activate and deactivate the power inverter 100. Operation of the power inverter 100 would be initially based upon the state of the vehicle ignition switch 410, and then controlled by the power inverter power switch 132. For example, when the vehicle ignition switch 410 is placed into an off configuration, power would not be provided from the DC power supply 400 to the power inverter 100 and therefore the power inverter 100 would be inoperable. Similarly, when the power inverter power switch 132 is placed into an off configuration, power would be interrupted between the DC power supply 400 and inverter 166; therefore the power inverter 100 would be inoperable.

When the power inverter 100 is active, AC power is provided to the inverter 166, which generates a DC power output. The DC power can be regulated through a voltage regulator 168. The regulated power is distributed to at least one alternating current (AC) output socket 140 and/or a hardwire connection 142, 144, 146 for use. The alternating current (AC) output socket 140 can be a standard AC power outlet, a ground fault circuit interrupter (GFCI), or any other suitable outlet for reception of a power plug.

Operational characteristics of the power inverter 100 can be monitored by a microprocessor 180. Software, data, and other digital information can be stored on a non-volatile digital memory device 182, wherein the non-volatile digital memory device 182 is in signal communication with the microprocessor 180. One or more condition monitoring sensing circuits or devices can be integrated into the power inverter 100, wherein each of the sensing devices is in direct or indirect signal communication with the microprocessor 180. Examples can include a temperature sensor, a voltage sensor, a power draw sensor, an amperage sensor, an electrical resistance sensor, and the like. The microprocessor 180 can operate in accordance with an instruction set to monitor various operating conditions of the power inverter 100. The instruction set would determine if any of the operating conditions are approaching or exceeding a predetermined acceptable limit. When the instruction set determines that one or more of the operating conditions are approaching or exceeding a predetermined acceptable limit, the microprocessor 180 would direct the error code display 136 to display a respective error or fault code. Details of the error or fault codes will be provided later herein.

Figure 12:
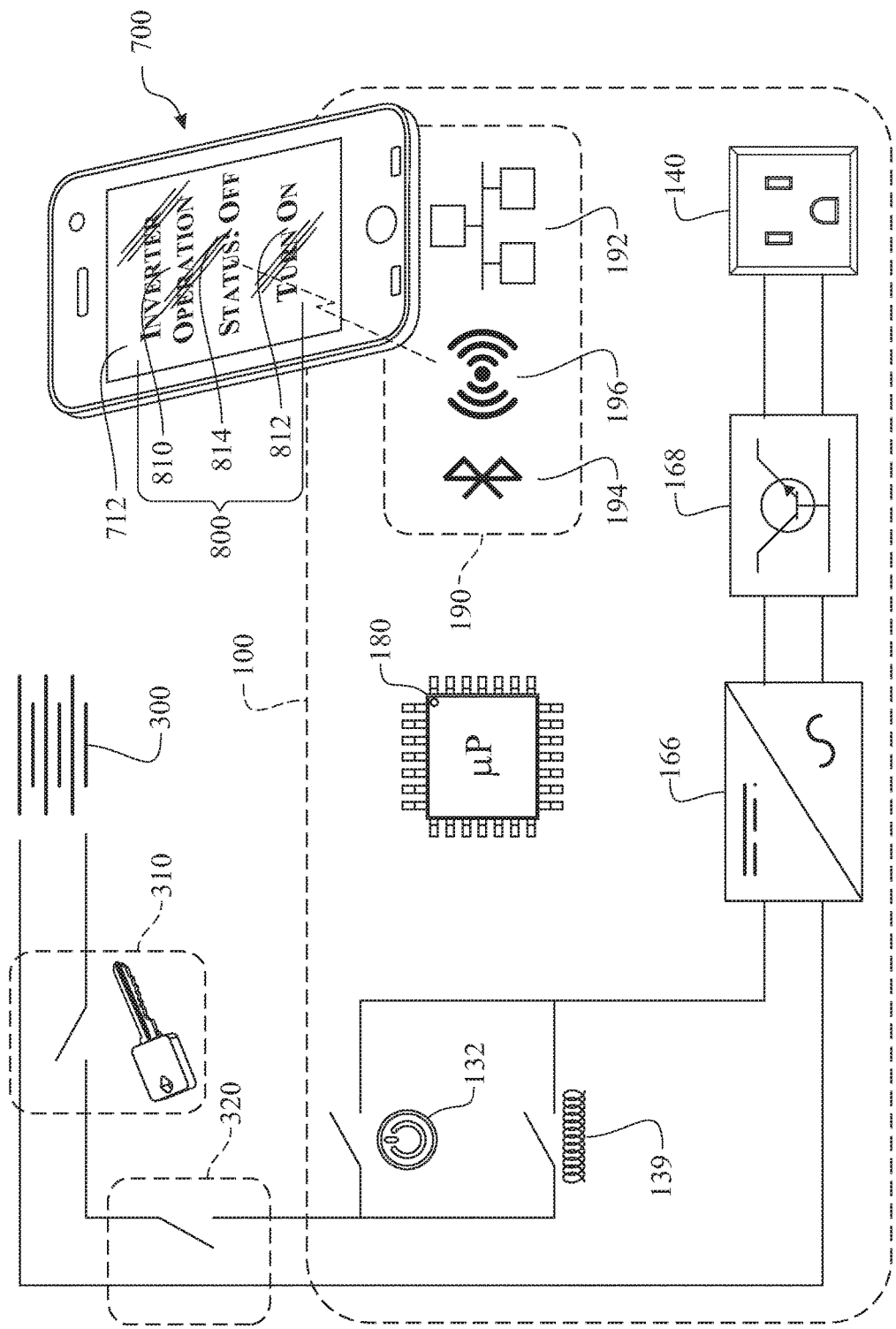
FIG. 12 presents a schematic diagram of the exemplary power circuit of the power inverter as originally introduced in FIG. 11, wherein the remote controlled operation is provided through an application running on a portable computing device.
Figure 16:
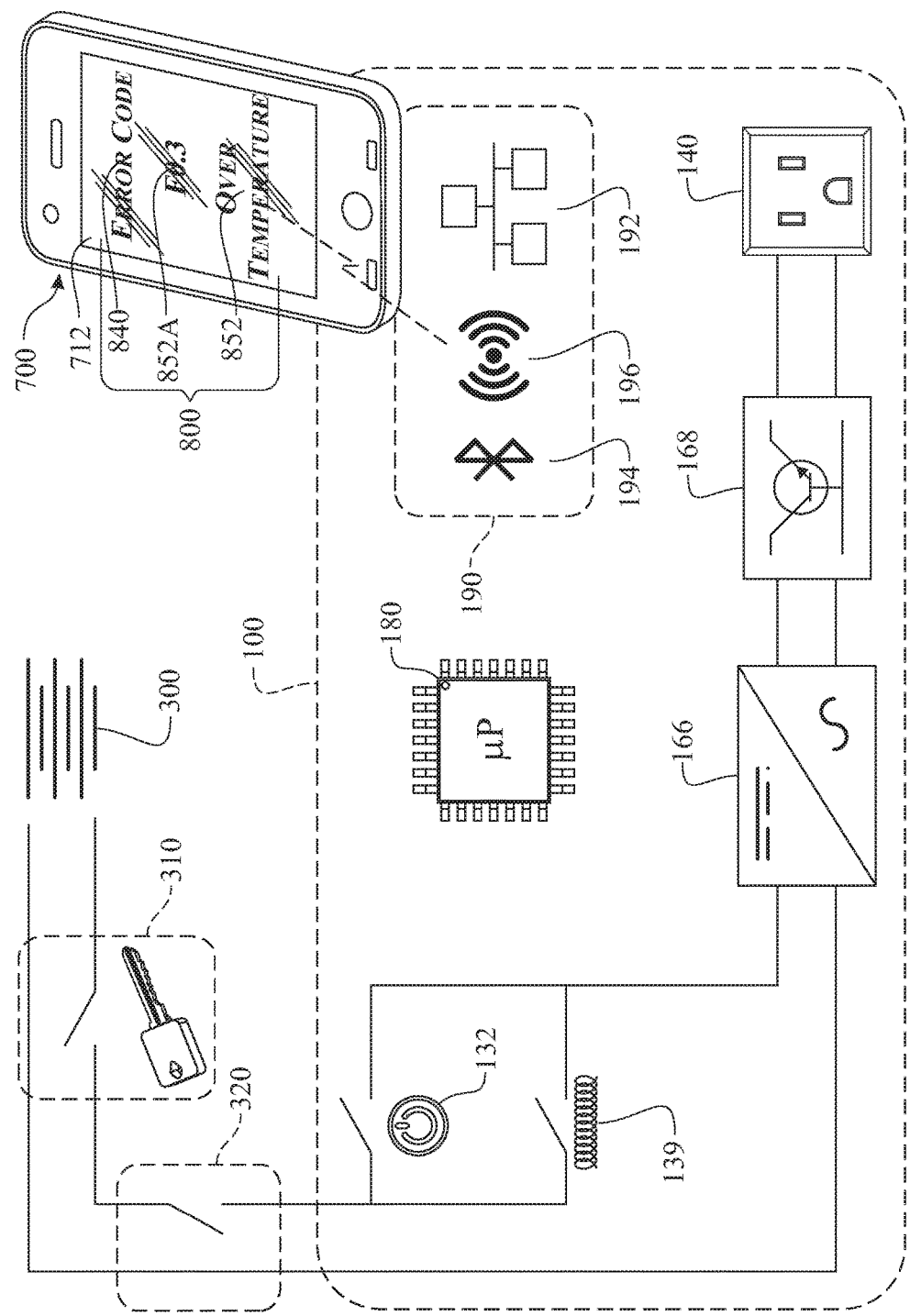
FIG. 16 presents a schematic diagram illustrating an exemplary function of an inverter operational error notification feature of the inverter interface application introduced in FIG. 14.
Figure 17:
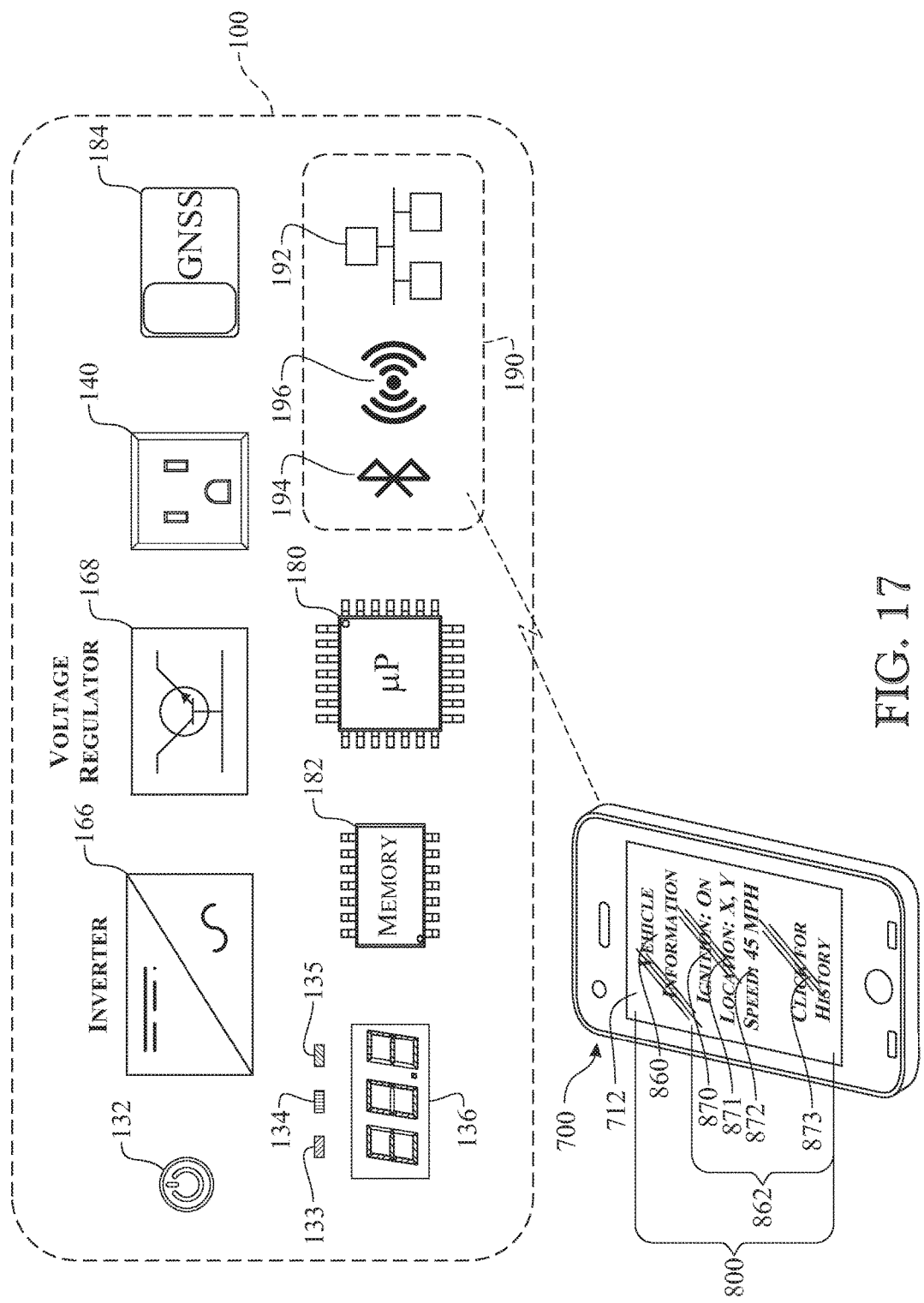
FIG. 17 presents a schematic diagram illustrating an exemplary vehicle information monitoring feature of the inverter interface application introduced in FIG. 14.

An operator can create a communication link between the power inverter 100 and another device using the Universal Serial Bus (USB) connector 137 or a communication circuit 190. The Universal Serial Bus (USB) connector 137 and the communication circuit 190 are both in digital communication with the microprocessor 180. The communication circuit 190 can adapted to provide any suitable communication protocol, such as a wired Ethernet communication circuit 192, a wireless Bluetooth communication circuit 194, a wireless Wi-Fi communication circuit 196, and the like. The wired Ethernet communication circuit 192 provides a wired communication link between the power inverter 100 and a locally residing computer, server, network, and the like. The wireless Bluetooth communication circuit 194 and the wireless Wi-Fi communication circuit 196 provide a wireless communication link between the power inverter 100 and a portable computing device 700, as illustrated in FIGS. 12, 16, and 17. The wireless Bluetooth communication circuit 194 and wireless Wi-Fi communication circuit 196 provide communication between the power inverter 100 and the portable computing device 700, thus enabling an operator to roam about an area while maintaining communication with the power inverter 100. This communication link can enable an operator to remotely receive status information from the power inverter 100, remotely operate the power inverter 100, and the like. This capability will be described in more detail later herein.

The Universal Serial Bus (USB) connector 137 provides one exemplary interface that can be used for programming, revising programming, accessing any stored data, or any other useful interface for the operator. Although the exemplary interface is a Universal Serial Bus (USB) connector 137 it is understood that the interface can be of any suitable format and protocol enabling digital communication therebetween. Alternatively, the communication circuit 190 can be used to access and/or received data from the microprocessor 180 and/or the non-volatile digital memory device 182 to complete any desired digital communications.

Although the power inverter 100 includes a power inverter power switch 132 for controlling activation of the inverter, the power inverter 100 introduces alternative methods of controlling activation of the inverter. A bypass controller plug 200 can be used to bypass the power inverter power switch 132, as illustrated in FIG. 8. The bypass and/or remote controller connector 138 would be integrated in parallel to the power inverter power switch 132. The bypass controller plug 200 includes a circuit that closes the bypass and/or remote controller connector 138 when the bypass controller plug 200 is inserted into the bypass and/or remote controller connector 138. By closing the bypass and/or remote controller connector 138, the bypass controller plug 200 short circuits, bypasses, or overrides the power inverter power switch 132. This configuration redirects activation of the power inverter 100 from the power inverter power switch 132 to the vehicle ignition switch 410.

Figure 5:
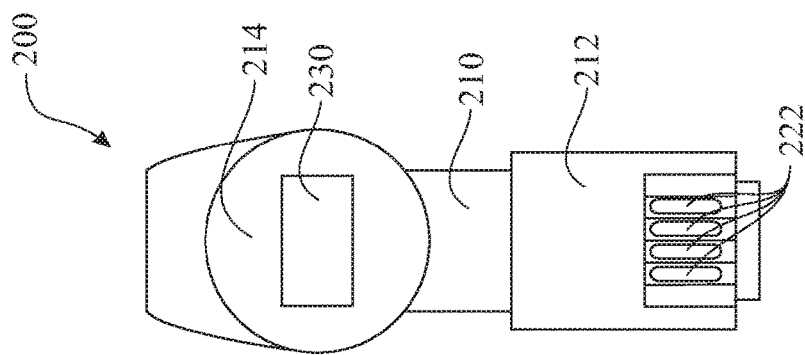
FIG. 5 presents a plan view illustrating the first exemplary bypass controller plug originally introduced in FIG. 4.
Figure 4:
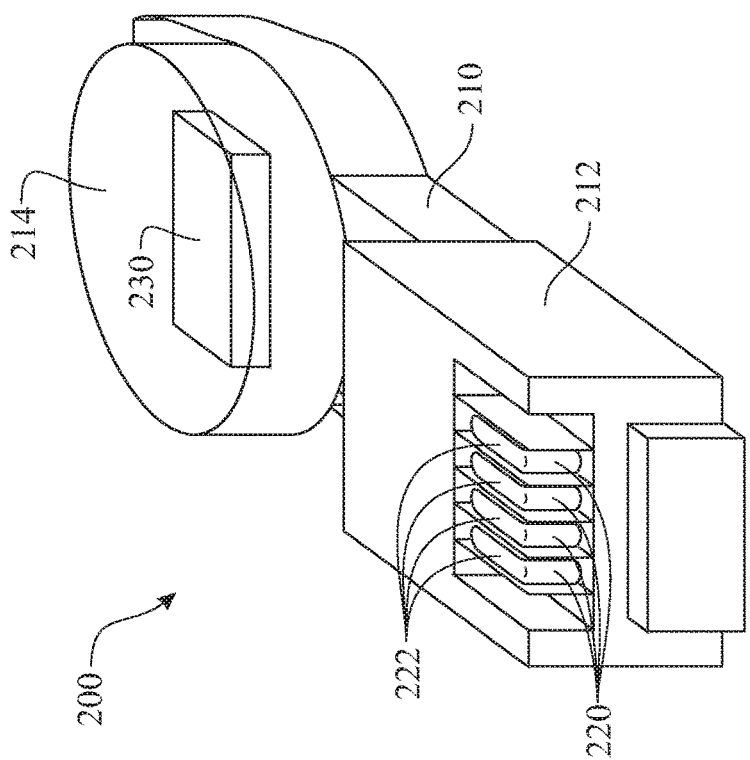
FIG. 4 presents an isometric view illustrating a first exemplary bypass controller plug.
Figure 7:
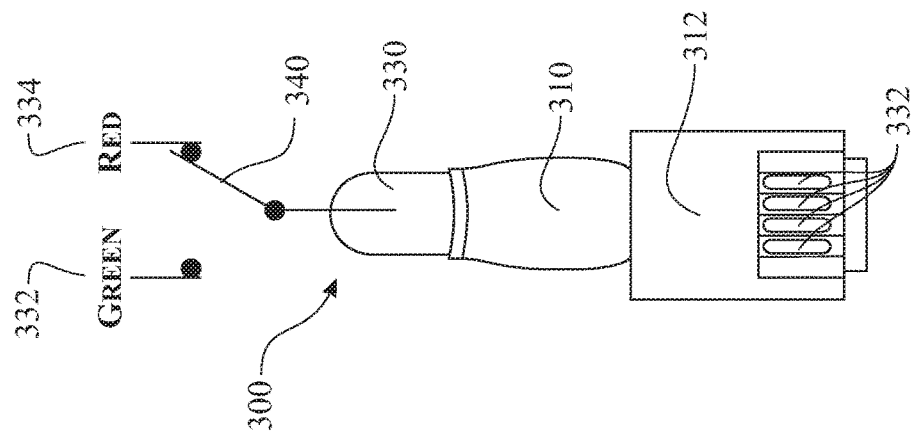
FIG. 7 presents a plan view illustrating a second exemplary bypass controller plug.
Figure 6:
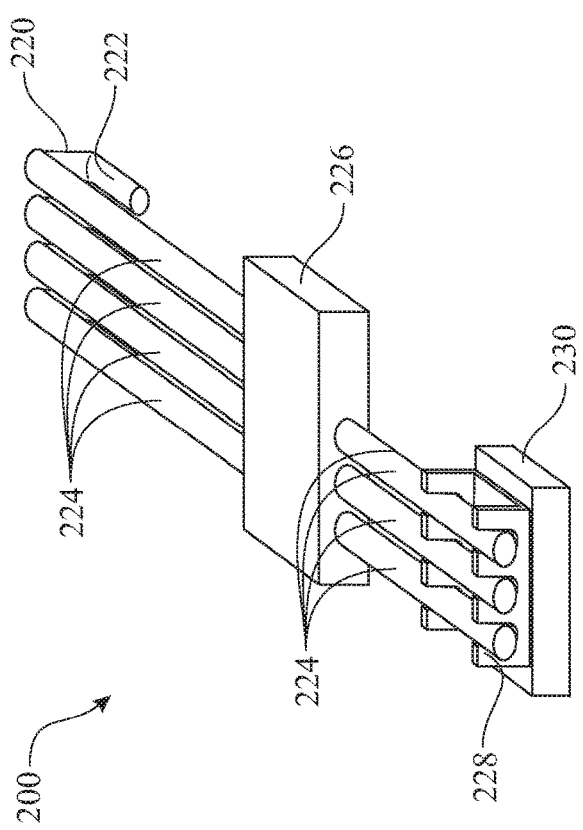
FIG. 6 presents an isometric view illustrating operating components of the first exemplary bypass controller plug originally introduced in FIG. 4.

Details of an exemplary bypass controller plug 200 are presented in FIGS. 4 through 6. In the exemplary embodiment, the bypass controller plug 200 includes a series of insulated conductors having an exposed end formed into contacts, each contact having an end contact section 220 and a slide contact section 222. The contact sections 220, 222 are formed within a bypass controller RJ connector section 212 of the bypass controller plug 200. The end contact section 220 is configured being perpendicular to an insertion direction. The slide contact section 222 is configured being parallel to an insertion direction. Opposite ends of the insulated wire section 224 are inserted into a wire jumper 228. The wire jumper 228 is fabricated of a conductive material. The wire jumper 228 includes a series of slots, each slot being sized to cut through the insulation and contact the conductive material of each respective insulated wire section 224. When completed, the wire jumper 228 shorts each of the insulated wire section 224 with one another. A wire strain relief 226 can be assembled over the series of insulated wire sections 224 to support the series of insulated wire sections 224 and increase long term reliability. The insulated portion of the insulated wire sections 224 are routed through a bypass controller body section 210 of the bypass controller plug 200. The status indicator light 230 would be secured within the bypass controller body section 210. A status indicator lens 214 can be included to protect the status indicator light 230.

An optional status indicator light 230 can be included to inform the operator of the presence and activation of the bypass system. The exemplary status indicator light 230 is a single color light emitting device. The status indicator light 230 is preferably a single color Light Emitting Diode (LED). In the exemplary configuration, the status indicator light 230 would indicate that the power inverter 100 is active or de-active.

The bypass controller plug 200 can be provided in any number of configurations. Although the exemplary bypass controller plug 200 includes a bypass controller RJ connector section 212, it is understood that any connector configuration can be utilized. Initially, the bypass controller RJ connector section 212 can be an RJ11, an RJ45, or any other RJ configuration of an RJ styled connector. Although the bypass controller RJ connector section 212 is illustrated as an RJ styled connector, the implementation can be of any suitable connector form factor, preferably one that includes a mechanical latch or other securing feature.

A bypass controller plug 300 is similar to the bypass controller plug 200. Like features of the bypass controller plug 300 and the bypass controller plug 200 are numbered the same except preceded by the numeral '3'. The bypass controller plug 300 includes an enhancement over the bypass controller plug 200. The bypass controller plug 200 is limited where the bypass controller plug 200 includes a single colored light emitting device and is configured to inform the operator if the power inverter 100 is powered on or off. The exemplary bypass controller plug 300 is an enhanced version of the bypass controller plug 200, wherein the bypass controller plug 300 includes circuitry and an improved bi-colored status indicator light 330 to inform the operate of a fault condition in addition to the power status of the power inverter 100. The exemplary bi-colored status indicator light 330 is a bi-colored LED or a multi-colored LED. The bypass controller plug 300 includes a light color emission controller circuit 340 or a similar circuitry to direct the bi-colored status indicator light 330 to emit a first colored light emission (green illumination 332) or a second colored light emission (red illumination 334). The bi-colored LED 330 would illuminate as a first color (green illumination 332) when power is provided to the power inverter 100 and operating conditions of the power inverter 100 are normal. The bi-colored LED 330 would illuminate as a second color (red illumination 334) when a fault or error condition is identified during operation of the power inverter 100. In the exemplary bypass controller plug 200, the bypass controller body section 210 is fabricated of a rigid, molded plastic. In the exemplary bypass controller plug 300, the bypass controller body section 310 is fabricated of a pliant material, such as heat shrink tubing. Although the embodiments of the bypass controller plug 200 and the bypass controller plug 300 are described having exemplary configurations, it is understood that the bypass controller plug 200 and the bypass controller plug 300 can be designed having any suitable configuration capable to providing the same functionality as described herein.

Figure 9:
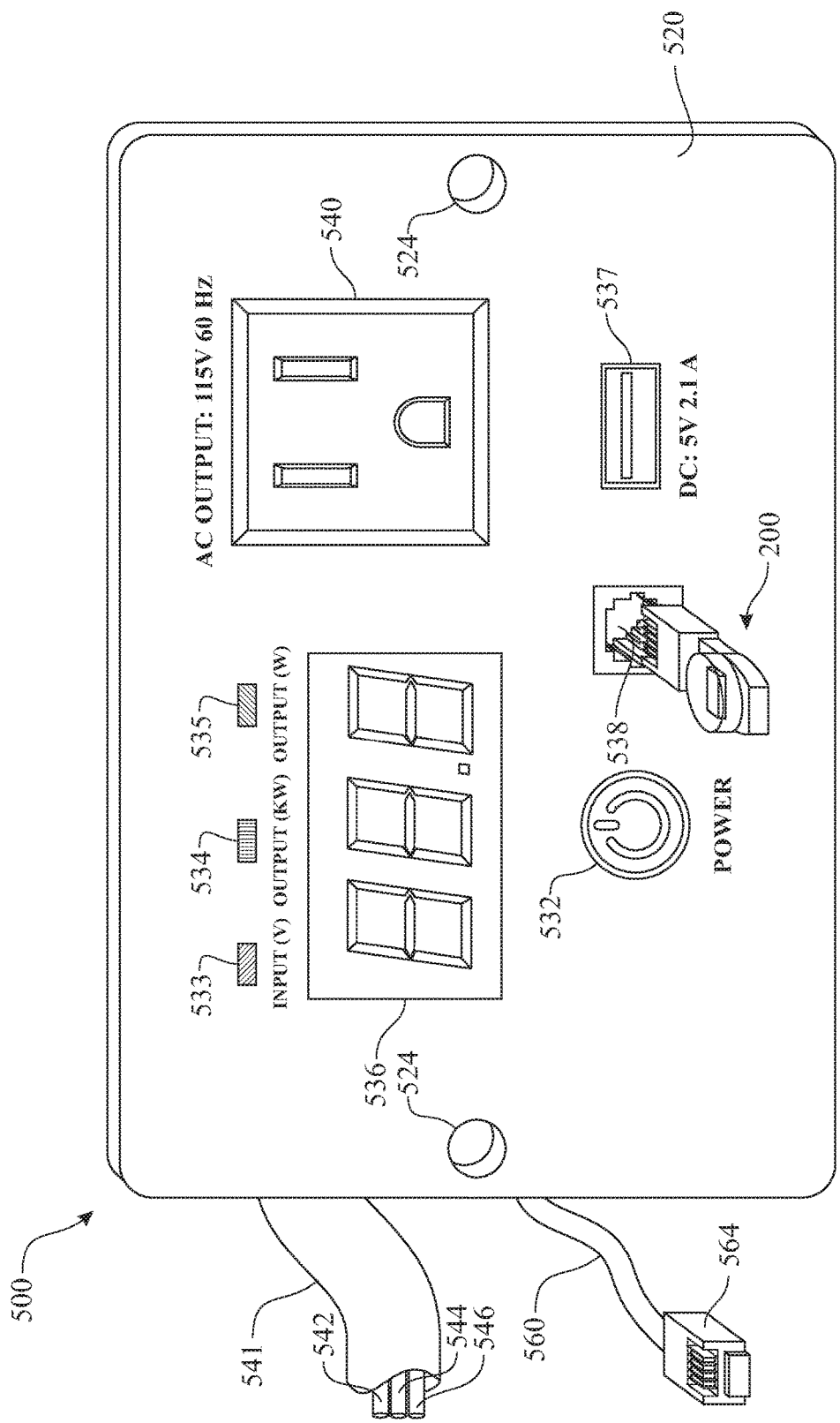
FIG. 9 presents an isometric front view of an exemplary power inverter remote unit, the power inverter remote unit being adapted to remotely operate the power inverter and provided power from the power inverter.
Figure 10:
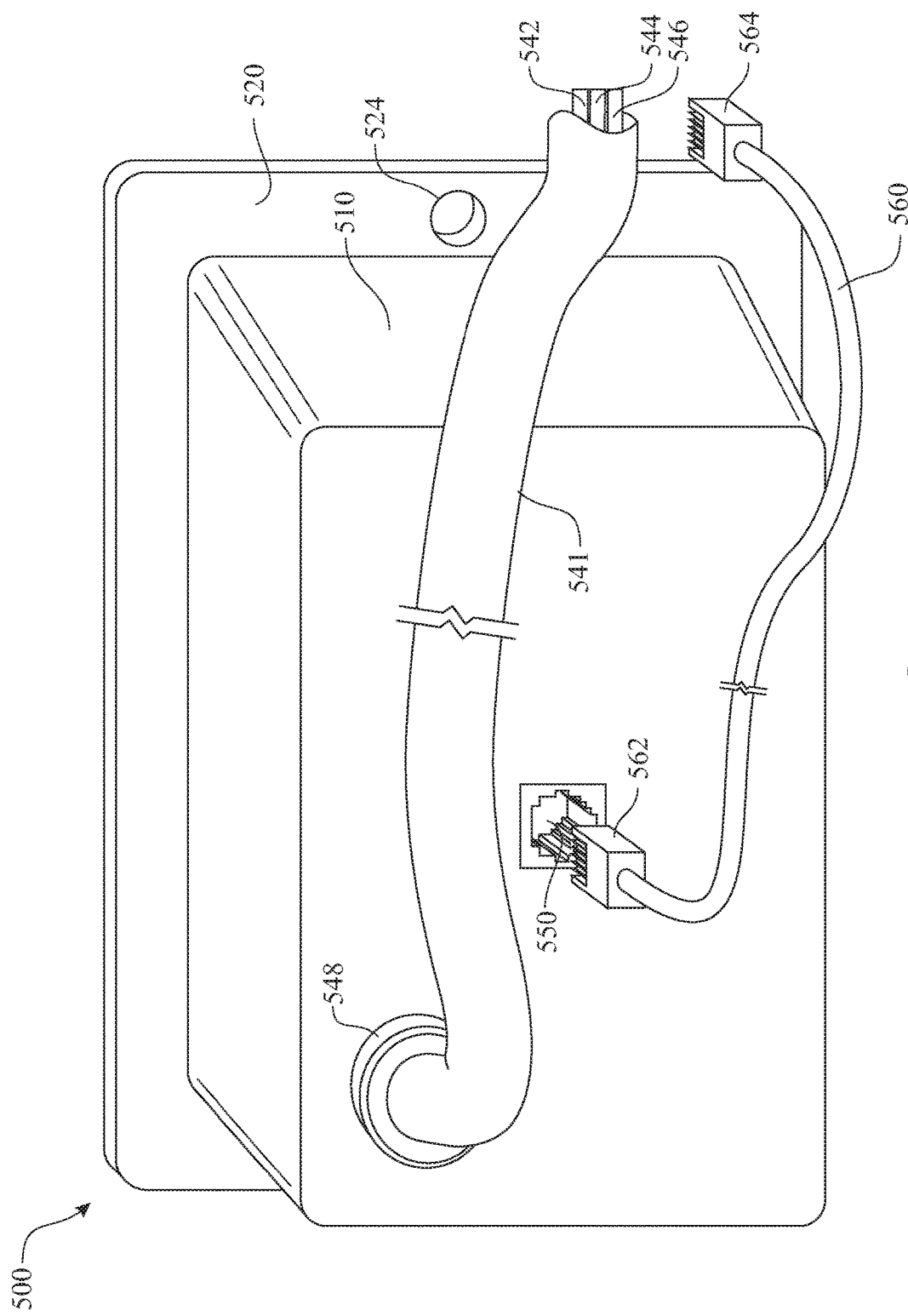
FIG. 10 presents an isometric rear view of the exemplary power inverter remote unit originally introduced in FIG. 9.

A power inverter remote unit 500, illustrated in FIGS. 9 and 10, expands the breadth for use of the power inverter 100. The power inverter remote unit 500 includes a limited portion of the elements of the power inverter 100. Like features of the power inverter remote unit 500 and the power inverter 100 are numbered the same except preceded by the numeral '5', except for those elements described herein. The power inverter remote unit 500 provides (1) remote operation of the power inverter 100 by replicating the controller features and communicating with the power inverter 100 and (2) a remotely located power socket. The power inverter remote unit 500 can be provided in any suitable form factor. The exemplary power inverter remote unit 500 includes a power inverter remote unit housing 510 formed having four sides and a backing panel defining an interior volume accessible through a front opening, and a power inverter remote unit front panel 520 secured to the power inverter remote unit housing 510, wherein the power inverter remote unit front panel 520 seals the front opening thereof. The exemplary power inverter remote unit front panel 520 has a larger peripheral edge compared to the mating surface of the power inverter remote unit housing 510. The overage of the power inverter remote unit front panel 520 defines a flange that is designed for mounting the power inverter remote unit 500 to a panel. The exemplary power inverter remote unit 500 includes a pair of power inverter remote unit front panel mounting apertures 524 for receiving mounting hardware, such as rivets, bolts, screws, or the like. A gasket can be placed between a rear surface of the power inverter remote unit front panel 520 and the receiving surface to provide isolation from vibration, a moisture barrier, and aid in deterring other detrimental conditions.

The power inverter remote unit 500 can be installed at a location that is distant from the power inverter 100. The power inverter remote unit 500 broadens the effectiveness of the power inverter 100. In one example, the power inverter remote unit 500 can be installed in one location of a vehicle and the power inverter 100 can be installed at a second location of the vehicle. This enables the operator to select the controller and AC outlet closest to the worksite and use that controller and AC outlet to activate the power inverter 100 and to obtain AC power.

Power is transferred from the power inverter 100 to the power inverter remote unit 500 by a power conductor cable 541. The exemplary power conductor cable 541 includes three conductors; a line output connector 542, a neutral output connector 544, and a ground connector 546. One end of the power conductor cable 541 would be connected to a remote alternating current (AC) output socket 540 or a plurality of remote alternating current (AC) output sockets 540. The opposite end would be connected to the hardwire connections 142, 144, 146 of the power inverter 100. In the illustrated example, the line output connector 542 would be connected to the line output connector 142, the neutral output connector 544 would be connected to the neutral output connector 144, and the ground connector 546 would be connected to the ground connector 146. A power conductor cable strain relief 548 can be included to increase long term reliability of the power conductor cable 541. The power inverter remote unit 500 enables the operator to obtain power from any of the at least one remotely located remote alternating current (AC) output socket 540.

The power inverter remote unit 500 includes power control features 532, 538, a Universal Serial Bus (USB) connector 537, as well as a variety of status indicators 533, 534, 535, 536. These elements function the same as their counterparts integrated into the power inverter 100. The data signals are conveyed from the power inverter remote unit 500 to the power inverter 100 by a controller signal cable 560. The exemplary controller signal cable 560 includes a first controller signal cable connector 562 assembled to a first end and a second controller signal cable connector 564 assembled to a second, opposite end. In the exemplary embodiment, both the first controller signal cable connector 562 and the second controller signal cable connector 564 are RJ45 style connectors. The first controller signal cable connector 562 would be inserted into a controller signal interface connector 550, wherein the controller signal interface connector 550 is in signal communication with the power control features 532, 538, the Universal Serial Bus (USB) connector 537 as well as the status indicators 533, 534, 535, 536. The second controller signal cable connector 564 would be inserted into the bypass and/or remote controller connector 138 of the power inverter 100. It is understood that the configuration of the controller signal cable 560 and the associated connectors can be modified; using any suitable connector configuration, or alternatively the controller signal cable 560 can be hardwired into at least one of the power inverter 100 and the power inverter remote unit 500.

Actuation of the power inverter power switch 532 would operate in a manner similar to the insertion of the bypass controller plug 200 into the bypass and/or remote controller connector 138. The circuit would be designed to provide a closed circuit along a path parallel to the power inverter power switch 132 when the power inverter power switch 532 is actuated. The bypass and/or remote controller connector 138 can include signal communications with the microprocessor 180, enabling transmission with error or fault information as well as the condition of operating parameters. The operational interface of the power inverter remote unit 500 would simply act as an extension from the operational interface of the power inverter 100.

Figure 11:
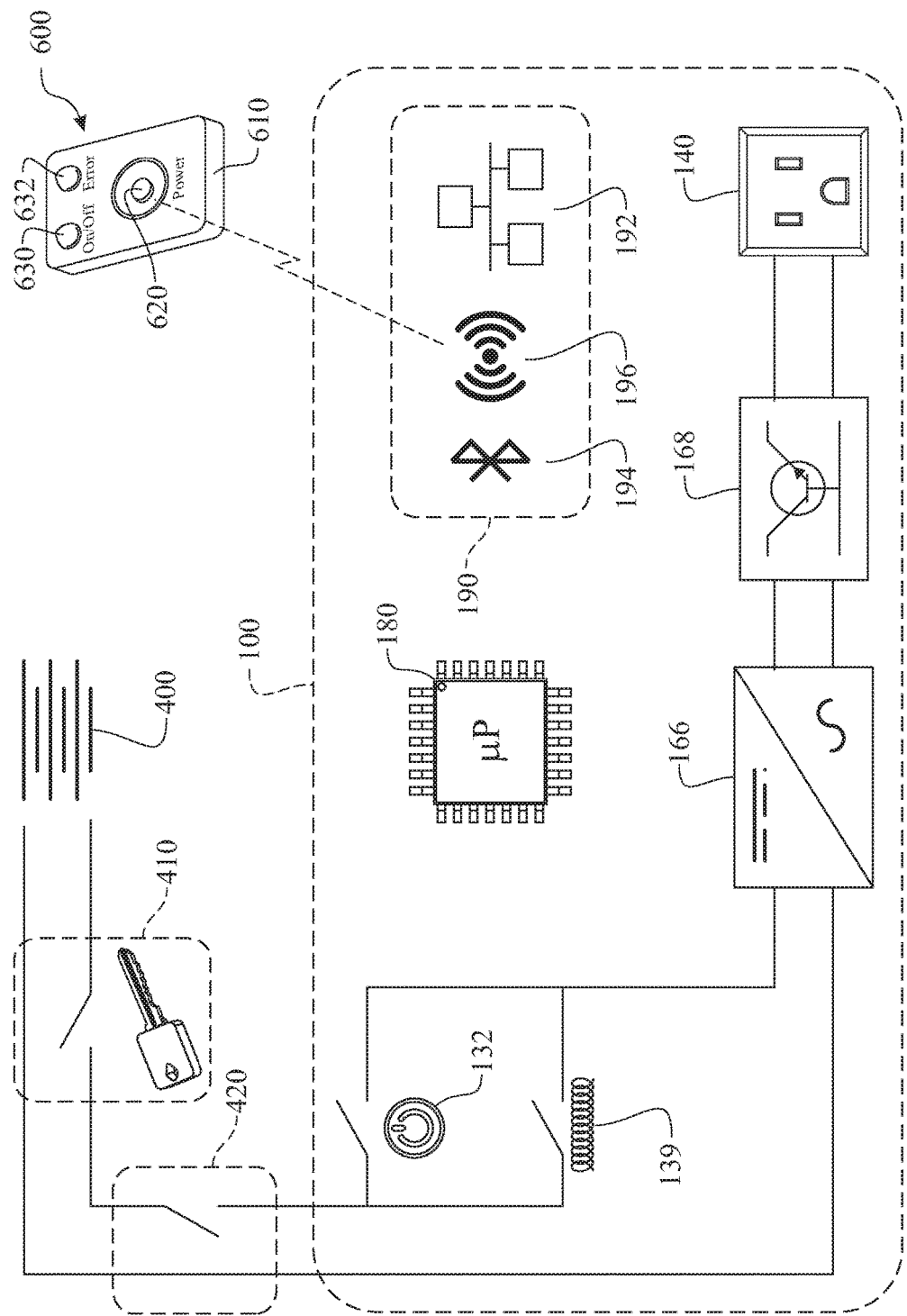
FIG. 11 presents a schematic diagram of an exemplary power circuit of the power inverter, the power circuit comprising the manual switch and an electromechanical power switch, wherein the electromechanical power switch is adapted for remotely controlled operation.

Activation of the power inverter 100 has been previously enabled by the power inverter power switch 132 or by use of the bypass controller plug 200, 300. Introducing an enhanced feature, activation of the power inverter 100 can be accomplished using a basic inverter remote control 600 as shown in FIG. 11. The basic inverter remote control 600 would include components common with a standard basic remote control device, including a housing 610 containing a microcontroller, a transceiver in signal communication with the microcontroller, an actuator switch 620 in signal communication with the microcontroller, and a portable power supply (battery) in signal communication with the microcontroller. The transceiver would be compatible with any of the wireless communication protocols of the communication circuit 190, such as Bluetooth, Wi-Fi, or any other suitable wireless protocol employed therewith. When actuated, the remote control actuator 620 would direct the microcontroller and transceiver to transmit a power activation signal to the communication circuit 190 of the power inverter 100. The received power activation signal would result in activation of an electromechanical power switch 139. The electromechanical power switch 139 would be provided in parallel with the power inverter power switch 132. This configuration mimics the use of the bypass controller plug 200. When the electromechanical power switch 139 is activated, the DC power supplied from the DC power supply 400 bypasses the power inverter power switch 132, activating the power inverter 100.

The basic inverter remote control 600 can include one or more indicator lights. The exemplary basic inverter remote control 600 includes an inverter on/off status indicator 630 and an inverter error indicator 632. The transceiver would receive condition information from the communication circuit 190 of the power inverter 100. The information would be decoded and the respective conditions would be presented to the operator using the inverter on/off status indicator 630 and/or the inverter error indicator 632. In a first exemplary operating condition, the inverter on/off status indicator 630 would emit a green light to indicate that the inverter is active. In a second exemplary operating condition, the inverter error indicator 632 would emit a red light to indicate that the inverter is experiencing a fault condition.

It is noted that although the illustration in FIG. 11 excludes several components previously shown, such as the bypass and/or remote controller connector 138, the bypass and/or remote controller connector 138 and other components can be included.

The basic inverter remote control 600 is limited to basic functionality. The basic inverter remote control 600 provides a low tier solution to the operator of the power inverter 100. The function of the basic inverter remote control 600 can be adapted for operation using an inverter interface application 800 running on a portable computing device 700, as illustrated in FIG. 12.

Figure 13:
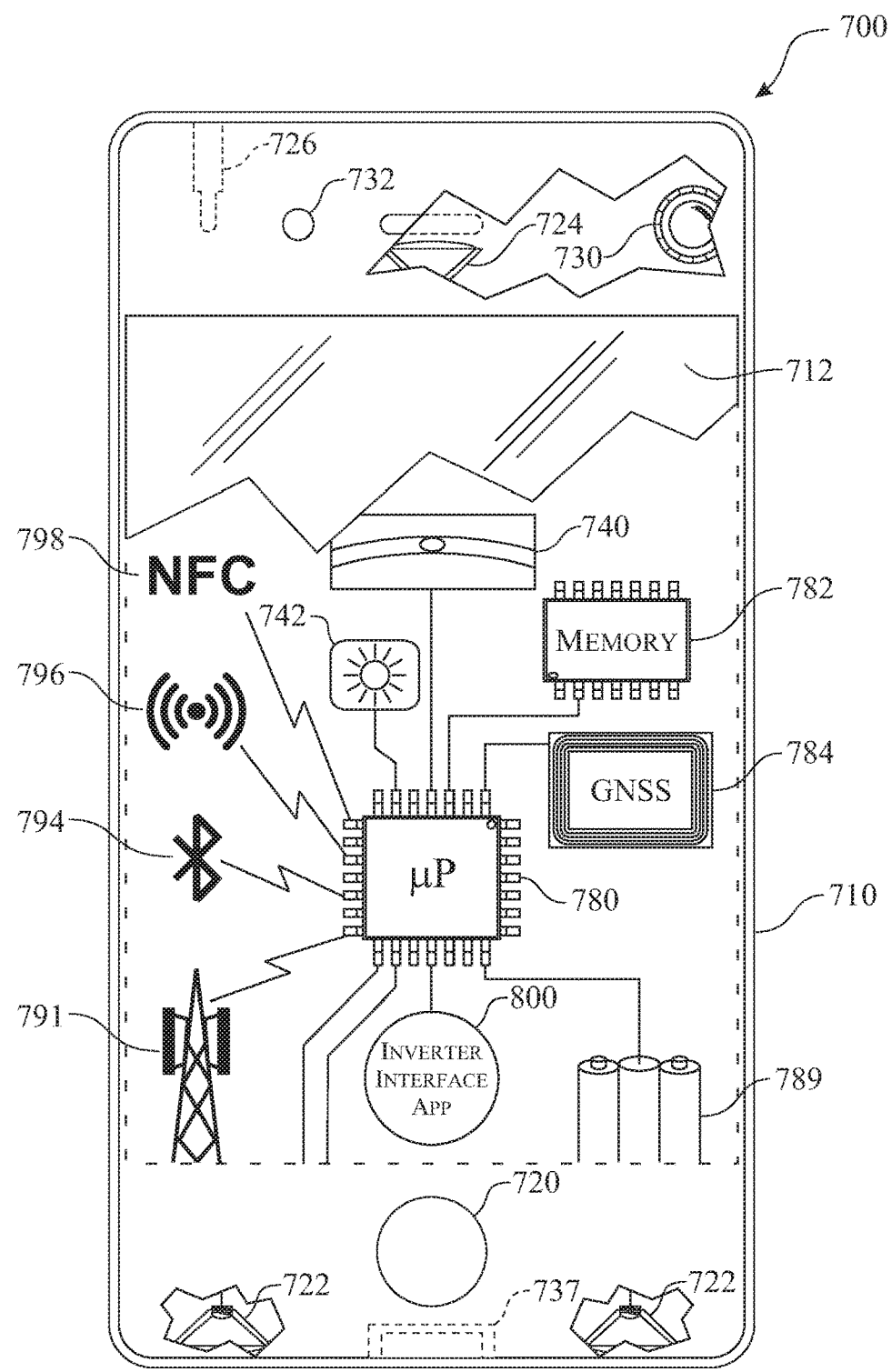
FIG. 13 presents a schematic diagram introducing operational components of an exemplary portable computing device, more specifically a Smartphone.

The use of the portable computing device 700 enables a broader functionality, generally at no additional cost. It is understood that portable computing devices 700 are widely accepted and available to the general population that would utilize the power inverter 100. Functional components of the portable computing device 700 are introduced in the exemplary illustration shown in FIG. 13.

The portable computing device 700 can be any suitable portable computing device, including a Smartphone, a portable computing tablet, a personal data assistant, a portable electronic wallet, or any other suitable portable computing device comprising the associated functions. The exemplary portable computing device 700 is a Smartphone. Although the components described herein are directed towards the Smartphone, it is understood that the components integrated into the portable computing device 700 would be those associated with the specific form factor.

A portable computing device housing 710 provides the exterior shape and structural foundation for the portable computing device 700. The portable computing device housing 710 can be fabricated of any suitable material, including plastic, glass reinforced plastic, metal, and the like. The portable computing device housing 710 supports and protects the various components of the portable computing device 700.

The portable computing device 700 includes a microprocessor 780, which operates in accordance with a set of operating instruction, which includes an inverter interface application 800 and a non-volatile digital memory device 782, which is provided in signal communication with the microprocessor 780 and used to store information in a digital format.

Motion and location information can be acquired by a Global Navigation Satellite System (GNSS) receiver 784 (or a similar locating system), a motion sensing system 740 (which can include an electronic gyroscope, an electronic compass, an accelerometer, and the like. Each of the motion and location sensing devices 784, 740 is provided in signal communication with the microprocessor 780.

The portable computing device 700 includes user interface components, such as a portable computing device touch screen display 712, a mechanical user input device 720, an audible output device 724, an audible input/output device 722, a forward viewing digital image acquisition device 730, and the like. The portable computing device touch screen display 712 can be a standard liquid crystal display, a touch screen display, and the like. The portable computing device touch screen display 712 can include a backlighting system, such as an electroluminescent panel, and the like. The user interface components can additionally include a keypad, a stylus, a track pad, a trackball, and the like.

The portable computing device 700 includes communication circuits, near field communication services, such as a Near Field Communication (NFC) communication circuit 798, a Wi-Fi communication circuit 796, a Bluetooth communication circuit 794, and the like and far field communication services, such as Bluetooth communication circuit 794, cellular communication circuit 791, and the like. The communication circuits are in signal communication with the microprocessor 780.

The portable computing device 700 can include optional ancillary components, such as a forward viewing digital image acquisition device 730, a rearward viewing digital image acquisition device 732, a general interface connector 737, an audio connector 726, a light sensing device 742, and others. The forward viewing digital image acquisition device 730 enables capturing images from a rear face of the portable computing device 700. The rearward viewing digital image acquisition device 732 enables capturing images from a front face of the portable computing device 700. The general interface connector 737 enables connectivity for data transfers, power, connectivity to other devices, and the like. The audio connector 726 enables audio output to a remote device, such as a headphone, ear-buds, and the like. The light sensing device 742 is employed to determine an ambient lighting and consequently adjust the backlighting of the portable computing device touch screen display 712, establish a flash setting when using the forward viewing digital image acquisition device 730, and the like.

Power is provided to the electronically operated components by a portable power supply 789. A power regulating circuit (voltage and/or amperage) can be integrated between the portable power supply 789 and one or more of the electrically powered components to ensure proper and adequate power distribution.

The portable computing device 700 enables enhancements of the power inverter 100. The inverter interface application 800 offers several functions on a single device. A first exemplary function, an inverter remote operating feature 810 (a simple remote power inverter activation and deactivation function) is presented in FIG. 12. The inverter remote operating feature 810 is similar to the functionality of the basic inverter remote control 600, as presented in FIG. 11. The status of the power inverter 100 can be displayed on the portable computing device touch screen display 712. The operator can activate and deactivate the power inverter 100 by selecting an inverter remote activation/deactivation icon 812 or by depressing the mechanical user input device 720. The respective communication circuit 794, 796 would encode and transmit a power switch operation signal to the communication circuit 190 of the power inverter 100. The received power switch operation signal would direct the electromechanical power switch 139 to toggle between an open circuit condition and a closed circuit condition, activating or deactivating the power inverter 100. The operating status of the power inverter 100 would be transmitted to the portable computing device 700 using the respective communication circuits 190. The inverter power status 814 would be presented on the portable computing device touch screen display 712 to inform the operator accordingly. It is understood that it would be beneficial to the operator to know the inverter power status 814 prior to toggling the power status by using the inverter remote operating feature 810.

Figure 14:
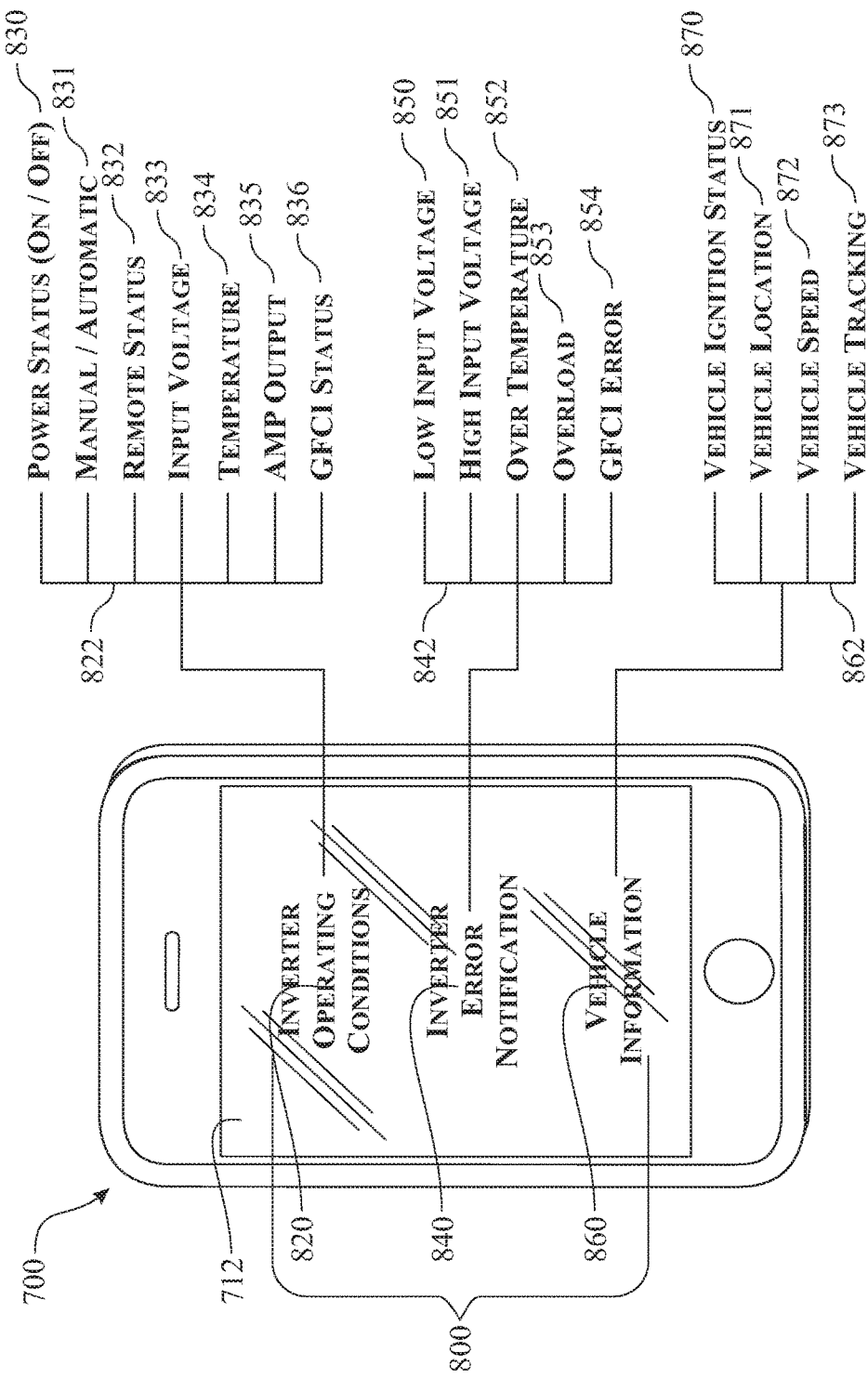
FIG. 14 presents a schematic diagram introducing additional exemplary functions of an inverter interface application.

Additional exemplary functions enabled by running the inverter interface application 800 on the portable computing device 700 include an inverter operating conditions monitoring feature 820, an inverter operational error notification feature 840 and a vehicle information monitoring feature 860, as introduced in FIG. 14.

The inverter operating conditions monitoring feature 820 would acquire and display a series of exemplary inverter operating characteristics 822 to the operator. The exemplary inverter operating characteristics 822 include:
  a) a power status indicator (on/off) 830,
  b) a manual/automatic power controller indicator 831,
  c) a remote unit status indicator 832,
  d) an input voltage 833,
  e) a temperature 834,
  f) an amperage output 835, and
  g) a Ground Fault Circuit Interrupter (GFCI) status indicator 836.

It is understood that additional characteristics can be monitored and presented to the operator.

The inverter operational error notification feature 840 would monitor the status of the power inverter 100 and would display errors or faults as the errors or faults are identified by the power inverter 100, as shown in FIG. 16. The errors or faults can be provided by the microprocessor 180 and/or determined from information received by the inverter operating conditions monitoring feature 820 and conveyed to the portable computing device 700 using the appropriate protocol 194, 196 employed by the communication circuit 190. The inverter operational error notification feature 840 can inform the operator of the faults by displaying the errors and/or faults on the portable computing device touch screen display 712, emitting an audible signal to attract the operator's attention, generating a haptic feedback to attract the operator's attention, and the like, or any combination thereof. The errors can be determined by pre-established values. The inverter operational error notification feature 840 can include a predictive feature, wherein the inverter operational error notification feature 840 would notify the operator when an operating condition obtained from the power inverter 100 or through the inverter operating conditions monitoring feature 820 is approaching a fault or error level. The inverter operational error notification feature 840 would escalate the alert when the operating condition reaches the fault or error level. The exemplary inverter operational alerts 842 include:
 a) a low input voltage alert 850,
 b) a high input voltage alert 851,
 c) an over temperature alert 852,
 d) an overload alert 853, and
 e) a Ground Fault Circuit Interrupter (GFCI) trip alert 854.

Figure 15:
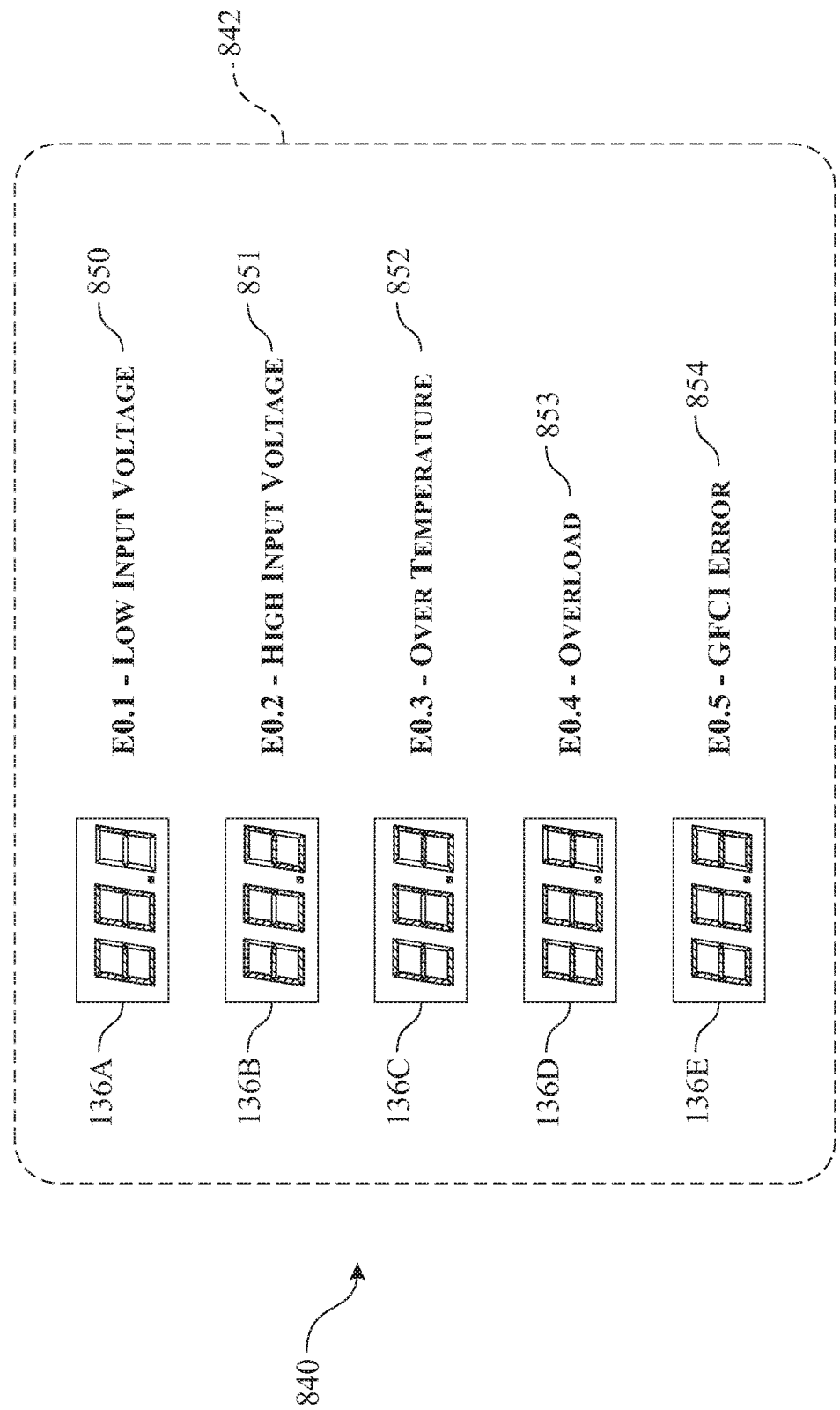
FIG. 15 presents a schematic diagram introducing several exemplary inverter operational alerts.

A series of exemplary error codes are presented in FIG. 15, with the communication process being shown in FIG. 16. Error codes can be represented in numeric formatting, alphabetical formatting, or in alphanumeric formatting as shown. The exemplary inverter operational alert 842, illustrated in FIG. 15, presents the exemplary alerts using exemplary alpha-numeric coding:
 a) the low input voltage alert 850, identified as "E0.1", as shown on the error code display (E01) 136A,
 b) the high input voltage alert 851, identified as "E0.2", as shown on the error code display (E02) 136B,
 c) the over temperature alert 852, identified as "E0.3", as shown on the error code display (E03) 136C,
 d) the overload alert 853, identified as "E0.4", as shown on the error code display (E04) 136D,
 e) the Ground Fault Circuit Interrupter (GFCI) trip alert 854, identified as "E0.5", as shown on the error code display (E05) 136E.

The actual coding sequence can be determined by the encoder and/or the operator. The exemplary inverter operational alert 842 would include additional codes for other error or faults.

In certain conditions, the operator can use the inverter interface application 800 to control the operation and/or adjust the configuration of the power inverter 100. The changes can be based upon the information received using the inverter operating conditions monitoring feature 820 and/or the inverter operational error notification feature 840.

The power inverter 100 is commonly installed in a mobile setting, such as a vehicle. In an enhanced variant, a Global Navigation Satellite System (GNSS) receiver 184 can be included within the power inverter 100, as shown in FIG. 17. It is noted that the components illustrated in FIG. 17 are only a portion of the components of the power inverter 100. The Global Navigation Satellite System (GNSS) receiver 184 is representative of any Global Positioning System (GPS) deployed around the world. The inclusion of the Global Navigation Satellite System (GNSS) receiver 184 enables location identification of the power inverter 100 as well as tracking capabilities of the movement of the power inverter 100. The history of the movements of the power inverter 100 (assumed to be the movements of the vehicle) can be stored in the non-volatile digital memory device 182. In addition to the capability of tracking the history of movements of the inverter/vehicle, the power inverter 100 can track the history of the vehicle ignition switch 410.

The inverter interface application 800 can offer a vehicle information monitoring feature 860. The vehicle information monitoring feature 860

The vehicle information monitoring feature 860 would obtain vehicle information from the power inverter 100. Exemplary vehicle data points 862 can include current operating conditions of the vehicle and/or a history of operation of the vehicle. The vehicle information monitoring feature 860 would display the provided information to the operator. The portable computing device 700 can be used as an intermediary device, such as a hotspot, to forward the provided vehicle data points 862 to a server, a supervisor, and the like. The vehicle information monitoring feature 860 can operate based upon a push system, where the vehicle sends information to the portable computing device 700 based upon an event, or a pull system, where the vehicle information monitoring feature 860 requests information from the power inverter 100. In the pull system, the vehicle information monitoring feature 860 can be configured to pull the information based upon time, an event, or any other trigger, the vehicle information monitoring feature 860 can be configured to pull the information upon a request from the operator, or both. The system can include settings to alert an operator, a supervisor, and the like when the vehicle conditions are unacceptable when compared to predetermined values, such as speed, location, time of travel, and the like. Upon determination of a condition where the vehicle conditions are unacceptable, the power inverter 100 can transmit a message to the vehicle information monitoring feature 860. In turn, the portable computing device 700, or other receiving device) would alert the operator, the supervisor, or any other party of the condition where the vehicle conditions are unacceptable. The alert can be a display, an audible alert, a haptic or tactile alert, or any other suitable alert, or any combination thereof.

The vehicle information monitoring feature 860 can include a predictive feature, wherein the vehicle information monitoring feature 860 would notify the operator when an operating condition is approaching a predetermined unacceptable condition. The vehicle information monitoring feature 860 would escalate the alert when the operating condition reaches the predetermined unacceptable condition. The exemplary vehicle data points 862 include:
 a) a vehicle ignition status indicator 870,
 b) a current vehicle location 871,
 c) a current vehicle speed 872, and
 d) a vehicle tracking 873.

The vehicle conditions provided in the above described vehicle data points 862 are only exemplary and it is understood that the vehicle information monitoring feature 860 can include additional vehicle conditions.

Figure 18:
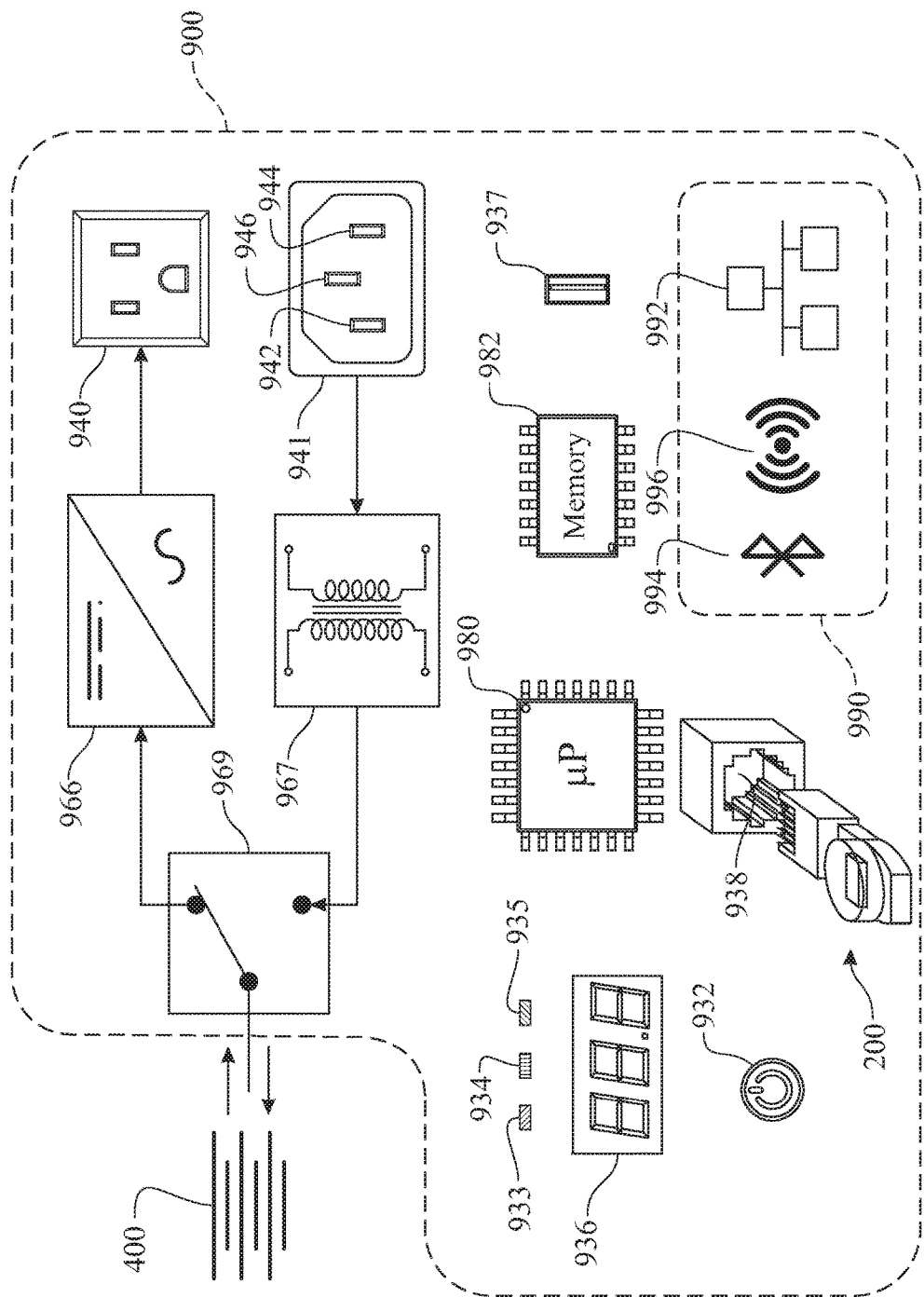
FIG. 18 presents a schematic diagram introducing an enhanced power inverter, wherein the enhanced variant includes a battery charging circuit.

The power inverter 100 can be enhanced to include a DC charging circuit, introduced in a power inverter/charger 900 illustrated in FIG. 18. The power inverter/charger 900 would include any or all of the components of the power inverter 100, as previously described, with the introduction of the DC charging circuit. A power selector switch 969 would be integrated between the power inverter circuit and the charging circuit. The setting of the power selector switch 969 would establish whether the power inverter/charger 900 is in an inverter configuration or a charging configuration. In the exemplary illustration, the power selector switch 969 is currently set placing the power inverter/charger 900 in an inverter configuration. The power selector switch 969 can be automatically operated, based upon a measured voltage of the DC power supply 400 or the power selector switch 969 can be manually operated as desired.

The charging circuit acquires AC power from an AC power source through an alternating current (AC) input socket 941. The alternating current (AC) input socket 941 can be provided in a form of a socket (as shown) or a hardwired connector configuration (such as the line output connector 142, neutral output connector 144, and ground connector 146 of the power inverter 100). The alternating current (AC) input socket 941 would include a configuration for receiving the AC input, including a line output connector 942, a neutral output connector 944, and a ground connector 946. The received AC power would be converted to DC power using a power transformer 967. The DC power is then provided to the DC power supply 400. It is understood that the instruction set provided to operate the microprocessor 980 would be modified to accommodate the charging circuit.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REFERENCE DESCRIPTIONS

Ref No. Description
100 power inverter
110 power inverter extruded housing
112 power inverter extruded housing top panel
114 power inverter extruded housing side panel
116 power inverter extruded housing cooling fin
118 mounting foot
119 mounting foot assembly fastener
120 power inverter operating panel
122 power inverter operating panel mounting flange
124 power inverter operating panel mounting flange fastener slot
126 power inverter operating panel cooling port
129 power inverter operating panel fastener
130 power inverter controller circuit assembly
132 power inverter power switch
133 input voltage indicator
134 output wattage (KW) indicator
135 output wattage (W) indicator
136 error code display
136A error code display (E0.1)
136B error code display (E0.2)
136C error code display (E0.3)
136D error code display (E0.4)
136E error code display (E0.5)
136F error code display (E0.6)
137 Universal Serial Bus (USB) connector
138 bypass and/or remote controller connector
139 electromechanical power switch
140 alternating current (AC) output socket
142 line output connector
144 neutral output connector
146 ground connector
150 power inverter input panel
152 power inverter input panel mounting flange
154 power inverter input panel mounting flange fastener slot
158 power inverter input panel cooling port
159 power inverter input panel fastener
160 DC positive terminal
162 DC negative terminal
164 DC ground terminal
166 inverter
168 voltage regulator
170 power inverter input panel cooling fan shroud
172 power inverter input panel cooling fan shroud fastener
180 microprocessor
182 non-volatile digital memory device
184 Global Navigation Satellite System (GNSS) receiver
190 communication circuit
192 wired Ethernet communication circuit
194 wireless Bluetooth communication circuit
196 wireless Wi-Fi communication circuit
200 bypass controller plug
210 bypass controller body section
212 bypass controller RJ connector section
214 status indicator lens
220 end contact section
222 slide contact section
224 insulated wire section
226 wire strain relief
228 wire jumper
230 status indicator light
300 bypass controller plug
310 bypass controller body section
312 bypass controller RJ connector section
322 slide contacts
330 bi-colored status indicator light
332 green illumination
334 red illumination
340 light color emission controller circuit
400 DC power supply
410 vehicle ignition switch
420 battery isolator
500 power inverter remote unit
510 power inverter remote unit housing
520 power inverter remote unit front panel
524 power inverter remote unit front panel mounting aperture
532 power inverter power switch
533 input voltage indicator
534 output wattage (KW) indicator
535 output wattage (W) indicator
536 error code display
537 Universal Serial Bus (USB) connector
538 bypass and/or remote controller connector
540 remote alternating current (AC) output socket
541 power conductor cable
542 line output connector
544 neutral output connector
546 ground connector
548 power conductor cable strain relief
550 controller signal interface connector
560 controller signal cable
562 first controller signal cable connector
564 second controller signal cable connector
600 basic inverter remote control
610 remote control housing
620 remote control actuator 630 inverter on/off status indicator
632 inverter error indicator
700 portable computing device
710 portable computing device housing
712 portable computing device touch screen display
720 mechanical user input device
722 audible input/output device
724 audible output device
726 audio connector
730 forward viewing digital image acquisition device
732 rearward viewing digital image acquisition device
737 general interface connector
740 motion sensing system
742 light sensing device
780 microprocessor
782 non-volatile digital memory device
784 Global Navigation Satellite System (GNSS) receiver
789 portable power supply
791 cellular communication circuit
794 Bluetooth communication circuit
796 Wi-Fi communication circuit
798 Near Field Communication (NFC) communication circuit
800 inverter interface application
810 inverter remote operating feature
812 inverter remote activation/deactivation icon
814 inverter power status
820 inverter operating conditions monitoring feature
822 exemplary inverter operating characteristics
830 power status indicator (on/off)
831 manual/automatic power controller indicator
832 remote unit status indicator
833 input voltage
834 temperature
835 amp output
836 Ground Fault Circuit Interrupter (GFCI) status indicator
840 inverter operational error notification feature
842 exemplary inverter operational alert
850 low input voltage alert
851 high input voltage alert
852 over temperature alert
853 overload alert
854 Ground Fault Circuit Interrupter (GFCI) trip alert
860 vehicle information monitoring feature
862 exemplary vehicle data points
870 vehicle ignition status indicator
871 current vehicle location
872 current vehicle speed
873 vehicle tracking
900 power inverter/charger
932 power inverter/charger power switch
933 input voltage indicator
934 output wattage (KW) indicator
935 output wattage (W) indicator
936 error code display
937 Universal Serial Bus (USB) connector
938 bypass and/or remote controller connector
940 alternating current (AC) output socket
941 alternating current (AC) input socket
942 line output connector
944 neutral output connector
946 ground connector
966 inverter
967 power transformer
968 voltage regulator
969 power selector switch
980 microprocessor
982 non-volatile digital memory device
990 communication circuit
992 wired Ethernet communication circuit
994 wireless Bluetooth communication circuit
996 wireless Wi-Fi communication circuit

What is claimed is:

1. A power inverter, comprising:
a power inverter circuit adapted to convert a direct current (DC) input to an alternating current (AC) output;
a microprocessor; and
a communication circuit in signal communication with the microprocessor,
a manual power switch integrated in a configuration to toggle a power operating state of the power inverter between an on condition and an off condition; and
a power bypass element, wherein the bypass element includes:
a bypass controller plug, and
an automated controller connector adapted to receive a bypass controller plug,
wherein the power inverter is configured to bypass the manual power switch when the bypass controller plug is inserted into the automated controller connector and the power status of the power inverter would be controlled by a state of the direct current (DC) input supplied to the power inverter,
wherein the microprocessor operates in accordance with an instruction set to monitor operating conditions of the power inverter and forward error codes to an operator through the communication circuit.

2. A power inverter as recited in claim 1, wherein the communication circuit includes at least one of:
a wired Ethernet communication circuit,
a wireless Bluetooth communication circuit, and
a wireless Wi-Fi communication circuit.

3. A power inverter as recited in claim 1, wherein the communication circuit includes at least one of:
a wireless Bluetooth communication circuit, and
a wireless Wi-Fi communication circuit,
the power inverter further comprising a manual power switch integrated in a configuration to toggle the power inverter between an on condition and an off condition;
an electromechanical power switch wired in parallel with the manual power switch; and
a signal controller that remotely operates the electromechanical power switch,
wherein the signal controller is a portable computing device,
wherein the error codes are communicated to the portable computing device using the at least one of:
a wireless Bluetooth communication circuit, and
a wireless Wi-Fi communication circuit.

4. A power inverter as recited in claim 1, further comprising an error code display, the error code display in signal communication with at least one of the microprocessor and the communication circuit, wherein the power inverter is adapted to display an error code on the error code display.

5. A power inverter as recited in claim 1, the bypass controller plug further comprising a status indicator light which illuminates when power is provided through the direct current (DC) input supplied to the power inverter.

6. A power inverter as recited in claim 1, the bypass controller plug further comprising an RJ connector, wherein the RJ connector provides electro-mechanical connectivity between the bypass controller plug and the automated controller connector.

7. A power inverter as recited in claim 6, wherein the signal controller is a portable computing device.

8. A power inverter as recited in claim 6, further comprising a global positioning receiver, the global positioning receiver in signal communication with the microprocessor.

9. A power inverter as recited in claim 6, further comprising a power transformer located in a circuit between an alternating current input device and a power selector switch,
wherein the power selector switch selectively toggles between the alternating current input device and the direct current (DC) input.

10. A power inverter as recited in claim 1, further comprising a manual power switch integrated in a configuration to toggle the power inverter between an on condition and an off condition;
an electromechanical power switch wired in parallel with the manual power switch; and
a signal controller that remotely operates the electromechanical power switch.

11. A power inverter, comprising:
a power inverter circuit adapted to convert a direct current (DC) input to an alternating current (AC) output;
a manual power switch integrated in a configuration to toggle a power operating state of the power inverter between an on condition and an off condition; and
a power bypass element, wherein the bypass element includes:
a bypass controller plug, and
an automated controller connector adapted to receive a bypass controller plug,
wherein the power inverter is configured to bypass the manual power switch when the bypass controller plug is inserted into the automated controller connector and the power status of the power inverter would be controlled by a state of the direct current (DC) input supplied to the power inverter.

12. A power inverter as recited in claim 11, the bypass controller plug further comprising at least one of:
a status indicator light which illuminates when power is provided through the direct current (DC) input supplied to the power inverter, and
an RJ connector, wherein the RJ connector provides electro-mechanical connectivity between the bypass controller plug and the automated controller connector.

13. A power inverter as recited in claim 11, further comprising a communication circuit including at least one of:
a wireless Bluetooth communication circuit, and
a wireless Wi-Fi communication circuit;
the power bypass element further comprising an electromechanical power switch wired in parallel with the manual power switch; and
a signal controller that remotely operates the electromechanical power switch,
wherein the signal controller is a portable computing device;
the portable computing device comprising a communication circuit including at least one of:
a wireless Bluetooth communication circuit, and
a wireless Wi-Fi communication circuit.

14. A power inverter as recited in claim 11, the bypass controller plug further comprising a status indicator light which illuminates when power is provided through the direct current (DC) input supplied to the power inverter.

15. A power inverter as recited in claim 11, the bypass controller plug further comprising an RJ connector, wherein the RJ connector provides electro-mechanical connectivity between the bypass controller plug and the automated controller connector.

16. A power inverter and controller system, comprising:
a power inverter comprising:
a power inverter circuit adapted to convert a direct current (DC) input to an alternating current (AC) output;
a power inverter microprocessor; and
a power inverter communication circuit in signal communication with the power inverter microprocessor, the communication circuit including at least one of (a) a wireless Bluetooth communication circuit, and (b) a wireless Wi-Fi communication circuit; and
the portable computing device comprising:
a portable computing device microprocessor;
a digital memory device in signal communication with the portable computing device microprocessor;
a portable computing device communication circuit in signal communication with the portable computing device microprocessor, the communication circuit including at least one of (a) a wireless Bluetooth communication circuit, and (b) a wireless Wi-Fi communication circuit; and
a power inverter interface application operating on the portable computing device, the application including an instruction set comprising a step using the power inverter communication circuit and the portable computing device communication circuit to interact with the power inverter.

17. A power inverter as recited in claim 16, the power inverter application instruction set further comprising a step of obtaining and displaying operating conditions of the power inverter.

18. A power inverter as recited in claim 16, the power inverter application instruction set further comprising a step of obtaining and displaying inverter operational errors of the power inverter.

19. A power inverter as recited in claim 16, the power inverter application instruction set further comprising a step of obtaining and displaying vehicle operating information obtainable through the power inverter.

20. A power inverter as recited in claim 16, the power inverter further comprising a Global Navigation Satellite System (GNSS) receiver;
the power inverter application instruction set further comprising a step of obtaining and displaying vehicle operating information obtainable through the power inverter,
wherein the vehicle operating information includes at least one of:
vehicle location information,
vehicle operating speed, and
vehicle tracking.

* * * * *